United States Patent
Bodagala et al.

(10) Patent No.: US 11,822,441 B2
(45) Date of Patent: *Nov. 21, 2023

(54) NODE FAILURE DETECTION AND RESOLUTION IN DISTRIBUTED DATABASES

(71) Applicant: NuoDB, Inc., Waltham, MA (US)

(72) Inventors: Sreenath Bodagala, Nashua, NH (US); Ross Shaull, Sudbury, MA (US); Paul D. Smith, Lexington, MA (US)

(73) Assignee: NuoDB, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,971

(22) Filed: Oct. 24, 2022

(65) Prior Publication Data

US 2023/0078926 A1 Mar. 16, 2023

Related U.S. Application Data

(63) Continuation of application No. 17/427,132, filed as application No. PCT/US2020/016449 on Feb. 3, 2020, now Pat. No. 11,500,743.

(Continued)

(51) Int. Cl.
*G06F 15/173* (2006.01)
*G06F 11/18* (2006.01)
(Continued)

(52) U.S. Cl.
CPC ............ *G06F 11/181* (2013.01); *G06F 16/27* (2019.01); *H04L 12/1877* (2013.01);
(Continued)

(58) Field of Classification Search
CPC .... G06F 11/181; G06F 16/27; H04L 41/0686; H04L 43/0811
(Continued)

(56) References Cited

U.S. PATENT DOCUMENTS

| 6,002,851 A | 12/1999 | Basavaiah et al. |
| 7,324,438 B1 | 1/2008 | Savoldi et al. |

(Continued)

FOREIGN PATENT DOCUMENTS

| CN | 101110757 A | 1/2008 |
| CN | 101273333 A | 9/2008 |

(Continued)

OTHER PUBLICATIONS

Chandra et al., "Unreliable failure detectors for reliable distributed systems." Journal of the ACM (JACM) 43.2 (1996): 225-267.

(Continued)

*Primary Examiner* — Lan Dai T Truong
(74) *Attorney, Agent, or Firm* — Smith Baluch LLP

(57) ABSTRACT

Methods and systems to detect and resolve failure in a distributed database system is described herein. A first node in the distributed database system can detect an interruption in communication with at least one other node in the distributed database system. This indicates a network failure. In response to detection of this failure, the first node starts a failure resolution protocol. This invokes coordinated broadcasts of respective lists of suspicious nodes among neighbor nodes. Each node compares its own list of suspicious nodes with its neighbors' lists of suspicious nodes to determine which nodes are still directly connected to each other. Each node determines the largest group of these directly connected nodes and whether or not it is in that group. If a node isn't in that group, it fails itself to resolve the network failure.

20 Claims, 21 Drawing Sheets

Related U.S. Application Data

(60) Provisional application No. 62/800,009, filed on Feb. 1, 2019.

(51) Int. Cl.
  *G06F 16/27* (2019.01)
  *H04L 12/18* (2006.01)
  *H04L 41/0686* (2022.01)
  *H04L 43/0811* (2022.01)

(52) U.S. Cl.
  CPC ...... *H04L 41/0686* (2013.01); *H04L 43/0811* (2013.01); *G06F 2201/80* (2013.01)

(58) Field of Classification Search
  USPC .......................................................... 709/223
  See application file for complete search history.

(56) References Cited

U.S. PATENT DOCUMENTS

| | | | |
|---|---|---|---|
| 8,850,018 | B2 | 9/2014 | Massa et al. |
| 9,501,363 | B1 | 11/2016 | Ottavio |
| 10,282,247 | B2 | 5/2019 | Ottavio |
| 11,500,743 | B2 | 11/2022 | Bodagala et al. |
| 2013/0089094 | A1 | 4/2013 | Császár et al. |
| 2016/0315757 | A1 | 10/2016 | Malekpour |
| 2018/0095855 | A1 | 4/2018 | Sanakkayala et al. |
| 2021/0203562 | A1* | 7/2021 | Chen ....................... H04L 41/12 |

FOREIGN PATENT DOCUMENTS

| | | |
|---|---|---|
| CN | 102253269 A | 11/2011 |
| CN | 105429169 A | 3/2016 |
| CN | 105847278 A | 8/2016 |
| CN | 107330519 A | 11/2017 |
| CN | 107835983 A | 3/2018 |
| EP | 3150125 A1 | 4/2017 |
| WO | 2009122437 A2 | 10/2009 |

OTHER PUBLICATIONS

Extended European Search Report in European Application No. 20749510.2 dated Sep. 26, 2022, 10 pages.

International Search Report and Written Opinion in International Patent Application No. PCT/US2020/016449 dated Jun. 22, 2020, 12 pages.

Keidar et al., "Moshe: A group membership service for WANs." ACM Transactions on Computer Systems (TOCS) 20.3 (2002): 191-238.

Malloth et al., "View synchronous communication in large scale networks." 2nd Open Workshop of the ESPRIT project BROADCAST. No. 6360. 1995. 14 pages.

Ongaro et al., "In search of an understandable consensus algorithm." 2014 {USENIX} Annual Technical Conference ({USENIX}{ATC} 14). 2014. 16 pages.

Ongaro, Consensus: Bridging theory and practice. Stanford University, 2014. 248 pages.

Ranganathan et al., "Gossip-style failure detection and distributed consensus for scalable heterogeneous clusters." Cluster Computing 4.3 (2001): 197-209.

Notice of Allowance with Search Report (with translation) in Chinese Application No. 202080015570.1 dated Jul. 31, 2023, 10 pages.

* cited by examiner

NODE FAILURE DETECTION AND RESOLUTION IN DISTRIBUTED DATABASES

CROSS-REFERENCE TO RELATED APPLICATIONS

This application is a continuation of U.S. application Ser. No. 17/427,132, filed Jul. 30, 2021, and entitled "Node Failure Detection and Resolution in Distributed Databases," which is a U.S. national stage filing under 35 U.S.C. 371 of PCT/US2020/016449, filed Feb. 3, 2020, and entitled "Node Failure Detection and Resolution in Distributed Databases," which claims the priority benefit, under 35 U.S.C. § 119(e), of U.S. Application No. 62/800,009, entitled "Node Failure Detection and Resolution," filed on Feb. 1, 2019, each of which is incorporated herein by reference in its entirety.

BACKGROUND

Data and metadata in a distributed database are stored across multiple nodes that are in communication with each other. However, interruptions in communication can sometimes occur between nodes. For instance, a node within a distributed database system can find itself in an inconsistent state, thereby crashing or failing. In other instances, a virtual machine or process running on a node within the distributed database system can crash or fail. In still other instances, a communication link between a first node and a second node in the distributed database system can fail. For example, a network (e.g., Local Area Network, Wide Area Network, Ethernet, etc.) that connects two or more nodes in the distributed database system might fail thereby interrupting communication between the nodes.

SUMMARY

A distributed database system is described herein. The distributed database system can include a plurality of nodes. Each node in the plurality of nodes can include a corresponding processor and a corresponding memory. Each node in the plurality of nodes can be connected with every other node in the plurality of nodes. The processor at a first node in the plurality of nodes can be configured to resolve a failure in the distributed database system by: identifying a suspicious node in the plurality of nodes, broadcasting a first list of suspicious nodes to neighbor nodes in the plurality of nodes, receiving a second list of suspicious nodes from at least one other neighbor node, determining whether the first node is in a winning fully connected component of the distributed database based on the connectivity information, in response to determining that the first node is in the winning fully connected component of the plurality of nodes, continuing to operate the first node, and in response to determining that the first node is not in the winning fully connected component of the plurality of nodes, failing the first node to resolve the failure. The suspicious node can be a node in the plurality of nodes that is no longer connected to the first node as a result of the failure in the distributed database system. The first list of suspicious nodes can include the suspicious node. The neighbor node can be nodes in the plurality of nodes that remain directly connected to the first node after the network failure. The winning fully connected component can include more than half of the nodes in the plurality of nodes and each node in the winning fully connected component is directly connected to each other node in the winning fully connected component.

A method for resolving a failure in a distributed database is described herein. The distributed database can include a plurality of nodes, each node in the plurality of nodes can be directly connected to each other node in the plurality of nodes. The method can include at a first node in the plurality of nodes: detecting an interruption in communication with a second node in the plurality of nodes, in response to detecting the interruption, initiating coordinated broadcasts of respective lists of suspicious nodes among neighbor nodes in the plurality of nodes, determining connectivity information based on the respective lists of suspicious nodes, and resolving the failure based at least in part on the connectivity information. The neighbor nodes can be nodes in the plurality of nodes that remain directly connected to the first node. The list of suspicious nodes for the first node includes the second node.

A method for resolving a failure in a distributed database is described herein. The distributed database can include a plurality of nodes, each node in the plurality of nodes can be connected to each other node in the plurality of nodes. The method can include in response to detecting the failure: at a first node in the plurality of nodes: determining whether the first node is connected with at least half of the nodes in the plurality of nodes, in response to determining the first node is directly connected with fewer than half of the nodes in the plurality of nodes, failing the first node to at least partially resolve the failure, in response to determining that the first node is directly connected with at least half of the nodes in the plurality of nodes, broadcasting a first list of suspicious nodes to neighbor nodes in the plurality of nodes, receiving a second list of suspicious nodes from at least one of the neighbor nodes, determining if the first list of suspicious nodes matches the second list of suspicious nodes, in response to determining that the first list of suspicious nodes matches the second list of suspicious nodes, keeping the first node operational in at least partial resolution of the failure, in response to determining that the first list of suspicious nodes does not match the second list of suspicious nodes, broadcasting a first updated list of suspicious nodes based on the first list of suspicious nodes and the second list of suspicious nodes to the neighbor nodes, receiving at least one second updated list of suspicious nodes from at least one of the neighbor nodes, determining connectivity information for the plurality of nodes based at least in part on the first updated list of suspicious nodes and the second updated list of suspicious nodes, determining a winning fully connected component of the distributed database based on the connectivity information, determining if the first node is in the winning fully connected component, in response to determining that the first node is in the winning fully connected component of the plurality of nodes, continuing to operate the first node to at least partially resolve the failure, and in response to determining that the first node is not in the winning fully connected component of the plurality of nodes, failing the first node to at least partially resolve the failure. The first list of suspicious nodes can include nodes that are not directly connected to the first node. The neighbor node can be nodes that remain directly connected to the first node after the failure. The winning fully connected component includes more than half of the nodes in the plurality of nodes and each node in the winning fully connected component node is directly connected to each other node in the winning fully connected component node.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
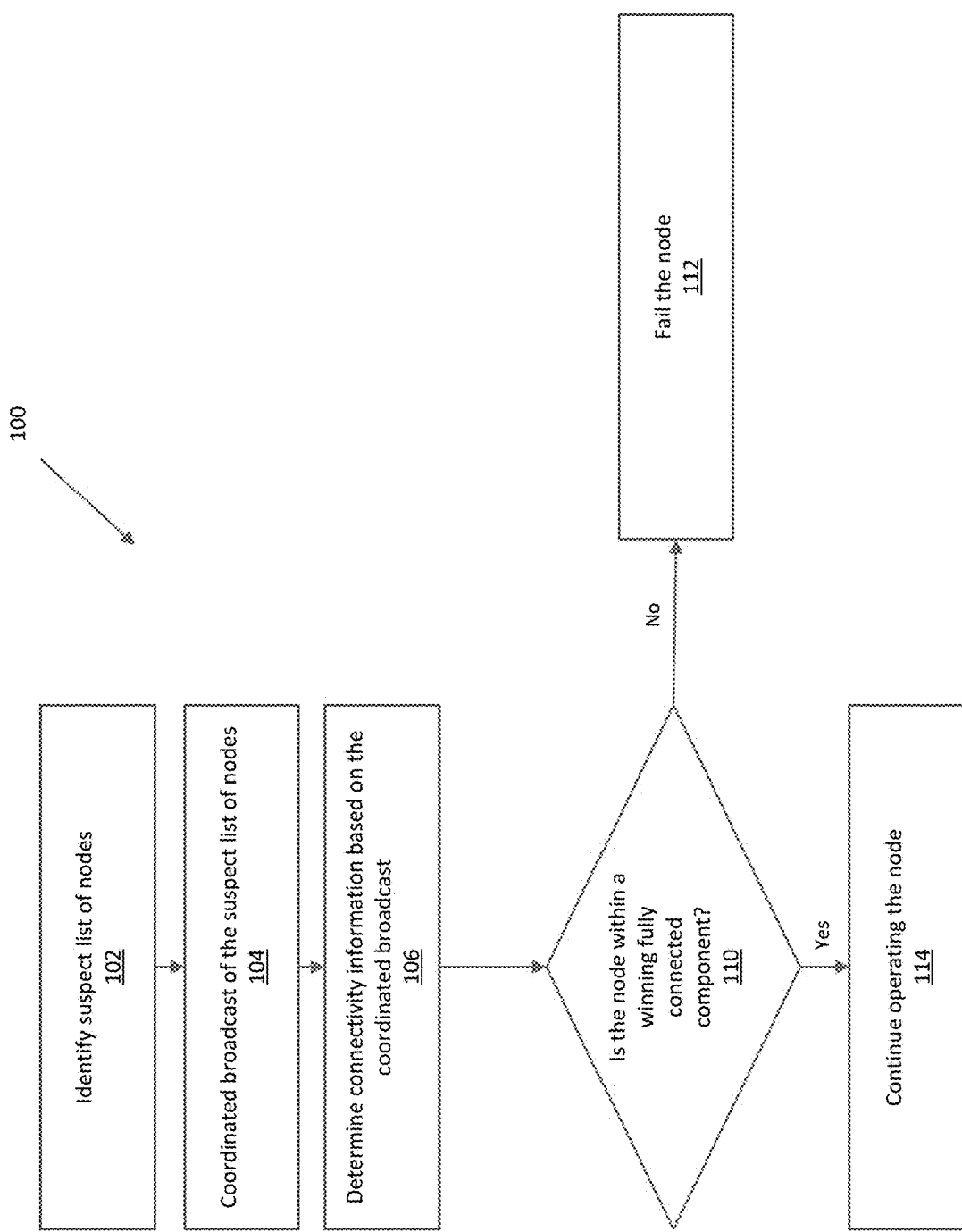
FIG. 1 illustrates a process of resolving network failures to restore complete connectivity between nodes in a distributed database.

A distributed database system includes multiple nodes that store fragments of data and/or metadata of a distributed database. All of the nodes in the distributed database system are connected directly to each other in a manner such that they can communicate with each other. However, there can be instances when one or more nodes in the distributed database system experience interruptions in communication due to network failure. These interruptions in communication can be due to a failed communication link between two or more nodes or due to a failure of one or more nodes. These failures can be resolved by identifying which nodes are still connected directly to each other, identifying the largest group of directly connected nodes, and failing the nodes that aren't part of that group as explained in greater detail below.

Distributed Database Systems

A distributed database system can include two types of nodes—transaction engine (TE) nodes that provide a user access to the distributed database, and storage manager (SM) nodes that maintain respective disk archives of the entire distributed database. While each storage manager node normally stores a copy of the entire distributed database, a single transaction engine node may contain only the portion of the distributed database necessary to support transactions being performed at that transaction engine node at that time.

Each node in the distributed database system has its own processor, memory, and communications interface(s) and can communicate directly with every other node in the distributed database system through a database system network. Communications between any two nodes can include transmitting serialized messages. The serialized messages can follow the Transmission Control Protocol (TCP) or any other suitable messaging protocol.

Each node in the distributed database system has a unique identifier (e.g., a lexicographic id) and stores a list of every other node, by unique identifier, in the distributed database system. Each node uses this list to track the status of every transaction engine node and storage manager node in the distributed database system. In addition, each node may track every database transaction and the locations of every database record (i.e., which nodes store which data fragments). The nodes may store this node and transaction information in respective copies of a master catalog that contains metadata about the distributed database system and is replicated across all nodes in the database. A new node receives a copy of the master catalog from another node, called an entry node, when it joins the distributed database system.

Tracking database transactions and the locations database fragments helps the distributed database system maintain Atomicity, Consistency, Isolation, and Durability—commonly known as ACID properties—in order to ensure accuracy, completeness, and integrity of the data in the distributed database.

Network Failure and Failure Detection

Each node in the distributed database system transmits "heartbeat" messages to every other node in the distributed database system at frequent intervals. For instance, each node sends heartbeat messages to every other node every second or couple of seconds. (Optionally, a node that receives a heartbeat message can transmit an acknowledgement message to the node that transmitted the heartbeat message.) If there is no interruption in communication, every node in the distributed database system continues to send heartbeat messages directly to and receive heartbeat messages directly from every other node in the distributed database system. However, a network failure can interrupt such communication. A node that detects an interruption in communication (e.g., not receiving a heartbeat message within a predetermined amount of time from another node) initiates a failure resolution protocol to resolve the network failure.

Resolving Network Failures

In the failure resolution processes presented here, the nodes in a distributed database regroup themselves in response to a network failure and fail themselves if they are not part of the largest fully connected group of nodes of majority size with the lowest lexicographical id ordering. If the largest fully connected group includes fewer than half the nodes in the distributed database system, then all of the nodes may fail themselves. Failing disconnected or partially connected nodes reduces the possibility that some or all of the database may become invalid. The failure resolution processes can be carried out in a leaderless fashion without blocking or aborting ongoing database transactions.

FIG. 1 illustrates a process 100 of resolving network failures. Any node in a distributed database system can initiate this process 100 in response to detecting a network failure (e.g., failure to receive a heartbeat message from another node within a predetermined period). At 102, a first node detects a network failure and initiates the failure resolution process 100 by creating a list of "suspect nodes," i.e., nodes that the first node suspects to have failed. For instance, the suspect list of the first node is a list of nodes that meet one or both of the following conditions: (a) the first node hasn't received a heartbeat message from those nodes within a predetermined timeout interval (e.g., pingTimeout seconds); and (b) the operating system has closed the connection(s) between the first node and the other node(s). At this point, if the first node's suspect list includes every other node in the distributed database system, the first node may fail itself to at least partially resolve the network failure.

At 104, the first node (i.e., the node that initiated process 100) broadcasts its suspect list of nodes to its neighbor nodes, which are the nodes that the first node can still communicate directly with following the network failure. (When there are no network failures, every node is a neighbor of every other node in the distributed database.) The neighbor nodes receive this suspect list and broadcast their own suspect lists to their neighbors. The neighbor nodes' suspect lists may be identical to or different from the first node's suspect list depending on the nature of the network failure.

At 106, the first node receives the suspect lists from its neighbor nodes and uses them and its own suspect list to construct a connectivity graph. The connectivity graph shows which nodes in the distributed database system the first node is actually directly connected to (i.e., which nodes are actually the first node's neighbor nodes). The other nodes also construct connectivity graphs. Depending on the nature of the network failure, these connectivity graphs may be the same as or different than the first node's connectivity graph. Similarly, each connectivity graph may be the complement of the corresponding node's suspect list.

Each node uses its connectivity graph to identify groups of nodes that remain directly connected to each other after the network failure. Each group of directly connected nodes is called a "fully connected component." In a fully connected component, each node continues to communicate with every other node within the fully connected component after the network failure. Once each node has identified the fully connected components within the distributed database system, it determines whether it is part of the "winning fully connected component" (110). If it is not part of a fully connected component, each node fails itself to resolve the network failure (112). If it is part of the winning fully connected component, it continues to operate (114).

A winning fully connected component can but does not have to include all the data in the database (e.g., it does not have to include a storage manager node). The procedure doesn't account for the types of nodes that form a winning fully connected component. (In some cases, though, the process can be modified to pay attention to the type of nodes in the fully connected components when determining the winning fully connected component.) If the winning fully connected component doesn't include all the data in the distributed database, then the user may intervene to ensure proper operation.

Each node can determine whether it is part of the winning fully connected component as follows. First, each node may determine if it is part of a fully connected component based on its connectivity graph. If not, it fails itself. But if a node is part of a fully connected component (or possibly more than one fully connected component), it determines the sizes of its fully connected component(s) based on its connectivity graph. If a node determines that it's not part of the largest fully connected component (based on its connectivity graph and information that each node stores about the other nodes in the distributed database system), it fails itself (112). If a node is part of the largest fully connected component, and that fully connected component contains more than half the total number of nodes in the distributed database system prior to the network failure, the node remains operational (114). This fully connected component is called the "winning fully connected component" because, at the end of the failure resolution process 100, it contains all of the operational nodes in the distributed database system.

If a node determines that there are two or more fully connected components that are the same size, each with more than half the nodes in the distributed database, and that are larger than all of the other fully connected components, it implements a tie-breaking process to identify the winning fully connected component. The tie-breaking process may include sorting the nodes in each fully connected component by the nodes' unique identifiers. Once the unique identifiers are sorted, the node picks the winning fully connected component based on a lexicographic ordering of the unique identifiers. For example, the node may pick the fully connected component with the lowest node id following a common prefix as the winning fully connected component.
Technical Advantages Over Other Failure Resolution Processes The failure resolution process illustrated in FIG. 1 has several differences and advantages over other processes for resolving failures in distributed databases. To start, unlike blocking processes, the failure resolution process illustrated in FIG. 1 evicts one or more nodes in the distributed database after a network failure to restore full, complete connectivity. Blocking is undesirable because it could roll back updates that are made to the data in the distributed database. Unlike other methodologies, the processes described herein does not include any sort of blocking mechanism.

In addition, the failure resolution process illustrated in FIG. 1 does not require or use a leader node. Conversely, other methodologies for resolving failures in a distributed database implement a strong leadership model. Basically, this methodology uses a leader node to make a failure resolution decision. Unlike this leader-based methodology, the processes described herein does not have a leader node that makes failure resolution decisions. Instead, as described above with respect to FIG. 1, any node can start the failure resolution process, and each node determines whether to fail itself or remain operational as part of the process without instructions from a leader node.

Unlike blocking and leader-based failure resolution processes, the non-blocking, leader-less failure resolution processes disclosed here can handle partial-connectivity network failures in a consistent manner. In a partial-connectivity network failure, a network partition within a distributed database system can cause a node or a set of nodes to communicate with only a subset of nodes in the distributed database system. In order to handle partial connectivity cases, other processes apply a rotating leader model to make the leader and informers use explicit message acknowledgements. In some cases, the causes the leadership to shift constantly between nodes experiencing an interruption in communication, potentially delaying (perhaps indefinitely) resolution of the network failure.

Different Cases of Network Failure

The process 100 does not let two or more disjoint groups of nodes (i.e., different fully connected components) stay up after a network failure event. To avoid trivial solutions (e.g., failing all of the nodes), the process 100 allows, where possible, a single group of nodes to stay up.

Additionally, if a user chooses to shut down half or more of the surviving nodes in the distributed database system then process 100 may not necessarily cause the rest of the nodes to fail. Process 100 can also handle slow links (i.e., communication path between two or more nodes where the connectivity is slow) in addition to link failures. Put differently, process 100 treats slow links and link failures in the same manner.

FIGS. 2-10 illustrate different types of network failures that can be resolved using the process 100 in FIG. 1.

Figure 2:
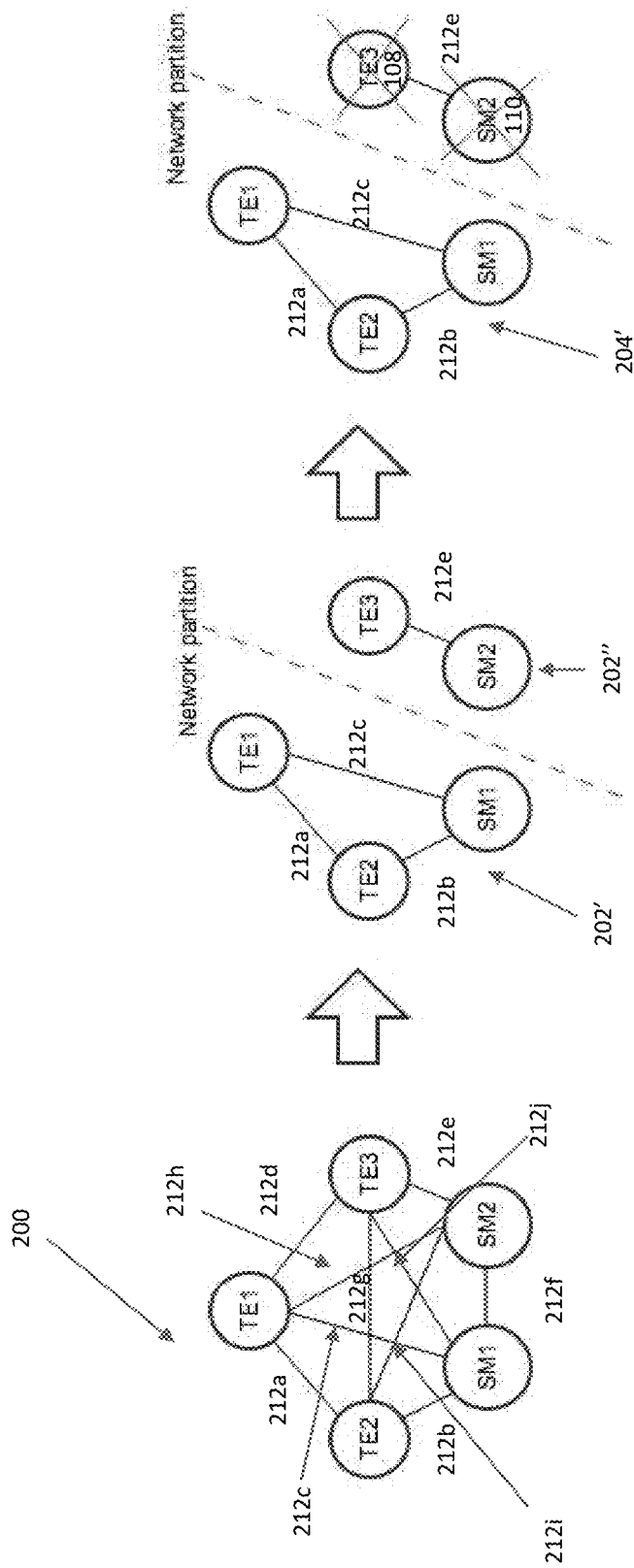
FIG. 2 illustrates an example of classic case of network failure in a distributed database system where a network partition event splits the distributed database system into two disjoint groups of fully connected nodes.

Case A: FIG. 2 shows the classic failure case, where a network partition event splits a distributed database system 200 into two or more disjoint groups of fully connected nodes. As seen at left in FIG. 2, the distributed database system 200 includes three transaction engine nodes TE1, TE2, and TE3 and two storage manager nodes SM1 and SM2, all of which are connected to each other. These nodes communicate with each other via respective communication links 212a-212j: TE1 communicates with TE2 via link 212a, TE2 communicates with TE3 via link 212d, TE3 communicates with SM2 via link 212e, SM2 communicates with SM1 via link 212f, TE2 communicates with SM1 via link 212b, TE2 communicates with SM1 via link 212c, TE1 communicates with SM2 via link 212h, TE3 communicates with SM1 via link 212j, and TE2 communicates with SM2 via link 212i.

In the middle of FIG. 2, a network partition splits the chorus into two disjoint groups of nodes (two fully connected components 202' and 202"). (The chorus or chorus group is the set of all nodes in the distributed database system.) In this instance, the first fully connected component 202' includes {TE1, TE2, SM1} and the second fully connected component 202" includes {TE3, SM2}. The process 100 then decides the first fully connected component 202' is the winning fully connected component 204' because it is larger than the second fully connected component 202" and includes more than half the nodes in the distributed database 200. The nodes {TE1, TE2, SM1} in the winning fully connected component 204' stay up, and nodes TE3 and SM2 fail themselves in response to discovering that they aren't in the winning fully connected component 204'.

Case B: FIG. 3-8 show different examples of partial connectivity. In each of these examples, a network partition or a (bidirectional) link failure(s) causes a node or a set of nodes to communicate with only a subset of other nodes in the distributed database system. In partial connectivity cases, the connectivity between nodes does not satisfy the transitive property—for example, node TE1 may be able to communicate directly with node TE2, which can communicate directly with node SM1, but node SM1 cannot communicate directly with node TE1.

Figure 3:
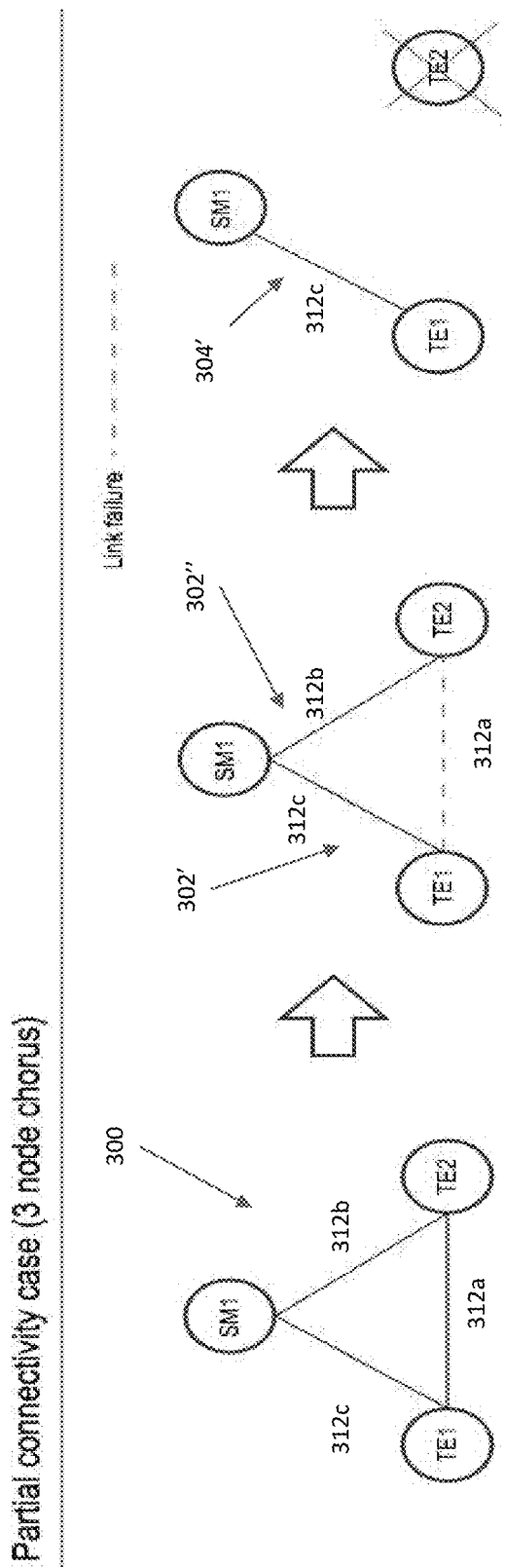
FIG. 3 illustrates an example distributed database system of three nodes with partial connectivity that can be resolved by the process shown in FIG. 1.

Example B1: FIG. 3 illustrates a distributed database system 300 with three nodes TE1, TE2, and SM1. As seen in FIG. 3, three nodes TE1, TE2, and SM1 form a chorus group with TE1 communicating with TE2 via link 212a, TE2 communicating with SM1 via link 212b, and SM1 communicating with TE1 via link 212c. A failure of link 212a between TE1 and TE2 (or a network partition between the data centers of TE1 and TE2, assuming TE1 and TE2 are in different data centers) creates two fully connected components 202' {SM1, TE1} and 202" {SM1, TE2}, with partial connectivity for nodes TE1 and TE2. Since the fully connected components 202' and 202" are the same size and have more than half the number of nodes that were up before the link failure, the nodes implement a tie-breaking process, such as the lexicographic ordering discussed above, to determine the winning fully connected component 204'. In FIG. 3, {SM1, TE1} is the winning fully connected component 204' (decided by the tie-breaking process such as lexicographic order), so SM1 and TE1 stay up and TE2 fails itself.

Figure 4:
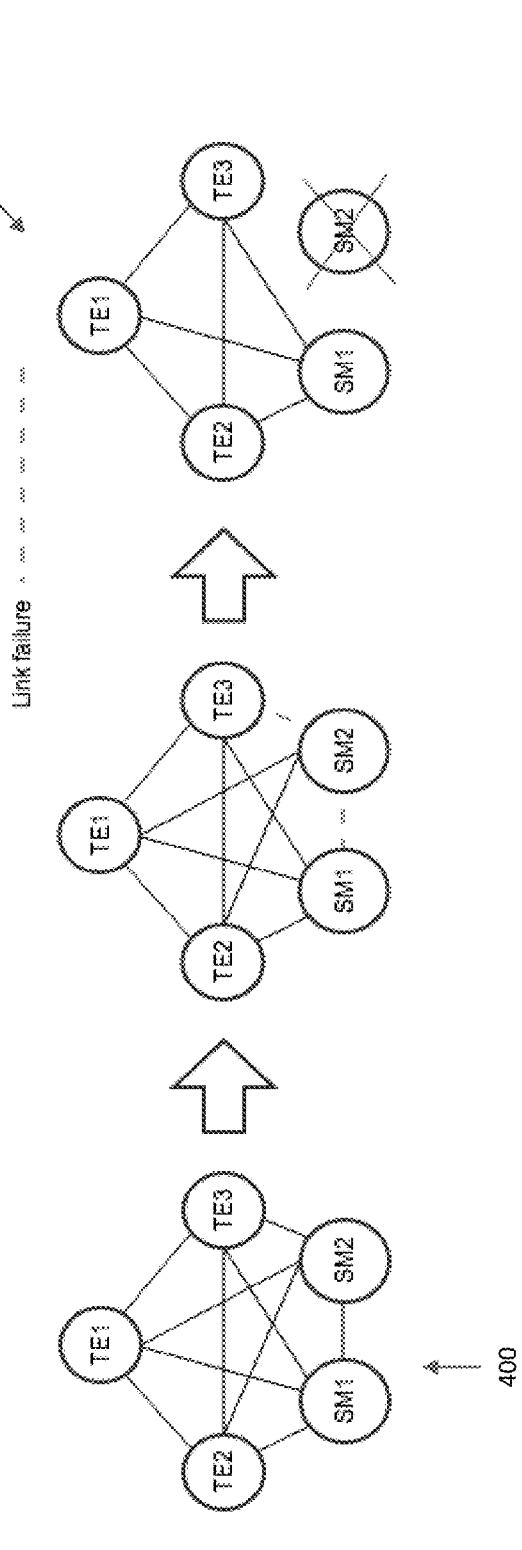
FIG. 4 illustrates an example distributed database system of five nodes with two link failures that can be resolved by the process shown in FIG. 1.

Example B2: FIG. 4 illustrates a distributed database system 400 with a chorus group of five nodes TE1, TE2, TE3, SM1, and SM2. In this example, two link failures occur: one between SM1 and SM2 (link 212f) and another one between SM2 and TE3 (link 212e). These failures yield fully connected components 402' {TE1, TE2, TE3, SM1}, and 402" {TE1, TE2, SM2}-node SM2 is partially connected to the other nodes, which remain connected directly to each other. The first fully connected component 402' {TE1, TE2, TE3, SM1} is the winning fully connected component 404' because it includes more than half the nodes and is larger than the other winning fully connected component 402". Node SM2 fails, and the other nodes stay up.

Figure 5:
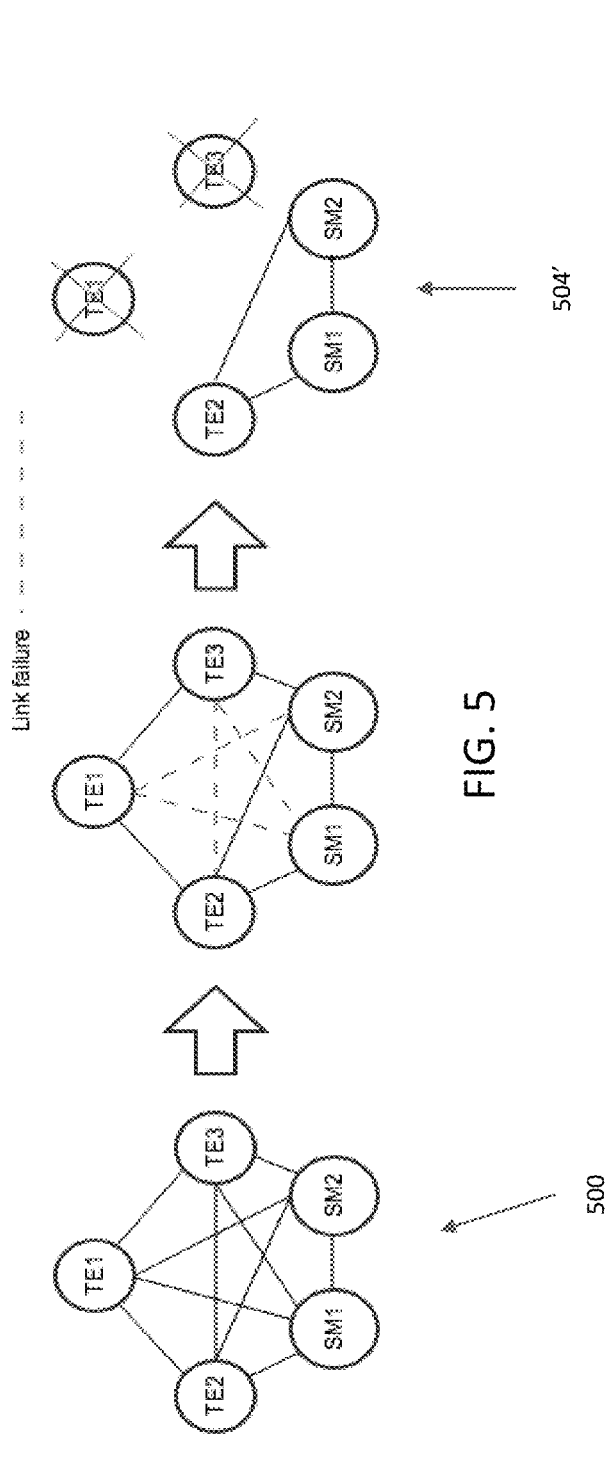
FIG. 5 illustrates an example distributed database system of five nodes with four link failures that can be resolved by the process shown in FIG. 1.

Example B3: FIG. 5 illustrates a five-node distributed database system 500 with a chorus group of five nodes TE1, TE2, TE3, SM1, and SM2 that experiences four link failures. In this example, the four link failures occur between TE1 and SM1 (link 212c), TE1 and SM2 (link 212h), TE2 and TE3 (link 212g), and TE3 and SM1 (link 212j). These failures yield several fully connected components, but only one with at least three nodes: {TE2, SM1, SM2}, shown at right. Nodes TE1 and TE3 remain partially connected to the distributed database but cannot communicate directly with every other node in the distributed database. As a result, nodes TE1 and TE3 fail, thereby leaving {TE2, SM1, SM2} as the winning fully connected component 404'.

Figure 6:
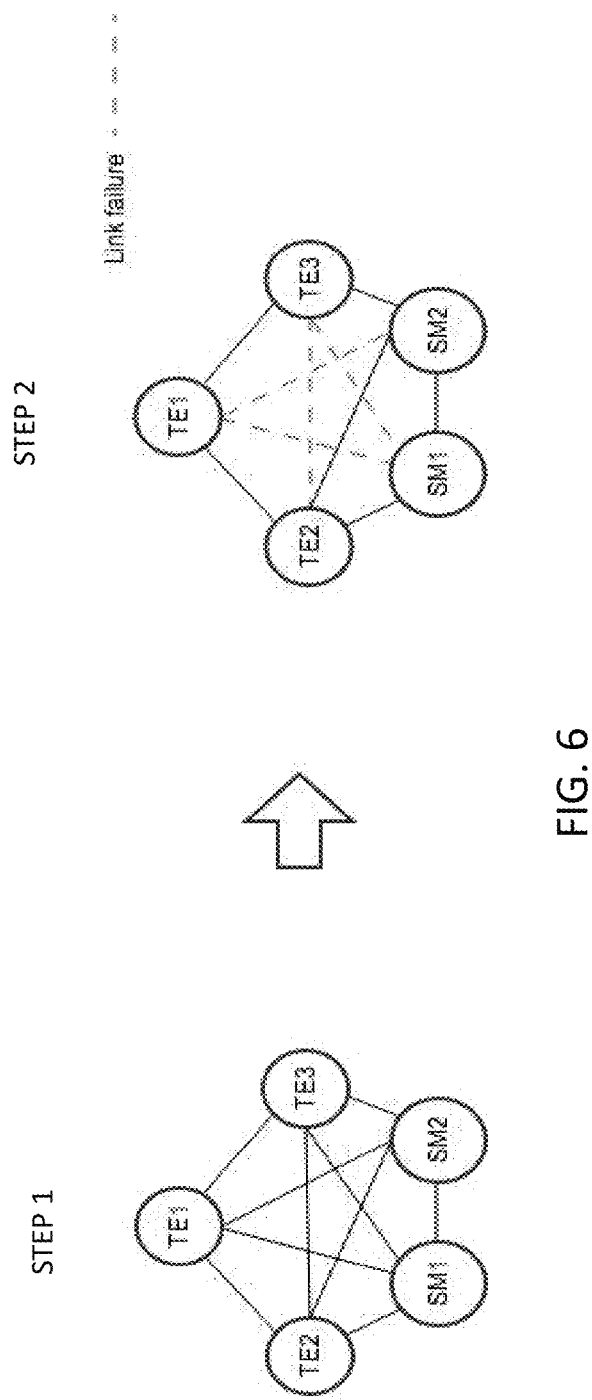
FIG. 6 illustrates an example of a partial connectivity case shown in FIG. 5.

FIG. 6 illustrates how the partial connectivity case of FIG. 5 cannot be addressed using a rotating leader model methodology. As shown in FIG. 6, five nodes TE1, TE2, TE3, SM1, and SM2 form a group under Step 1 (left). In Step 1, all of these nodes can communicate with each other without interruption. However, as show in Step 2 (right), failures occur in the communication links between TE1 and SM1 (link 212c), TE1 and SM2 (link 212h), TE2 and TE3 (link 212g), and TE3 and SM1 (link 212j). These failures interrupt direct communication between TE1 and SM1, between TE1 and SM2, between TE2 and TE3, and between TE3 and SM1.

SM1 is the current leader just prior to the network failure. Based on the rotating leader methodology following the link failures, SM1 continues to assume that it is the leader since it receives heartbeat messages from TE2 and SM2. TE1 rotates the leadership to TE2 because of the link failure between TE1 and SM1 (link 212c) owing to which TE1 does not receive heartbeat messages from SM1. In a similar fashion, TE3 rotates the leadership to TE1 because of the link failure between TE3 and SM1 (link 212j). Therefore, SM1, TE2, and TE1 take leadership (not necessarily in that order) in quick succession, but TE1 is not connected to SM1 or SM2 so it doesn't even know whether SM1 is connected to SM2 or not. This rotating leadership makes it difficult to resolve the failure(s).

Conceptually, as seen above, it is hard to make a centralized leader-based solution handle partial connectivity cases well because the leader node may not be connected to all other nodes (and so the leader may not know the connectivity information of all other nodes). However, the leaderless failure resolution processes described herein handle all of these partial connectivity cases in a reliable fashion and thus are improvements over leader-based failure resolution methods.

Figure 7:
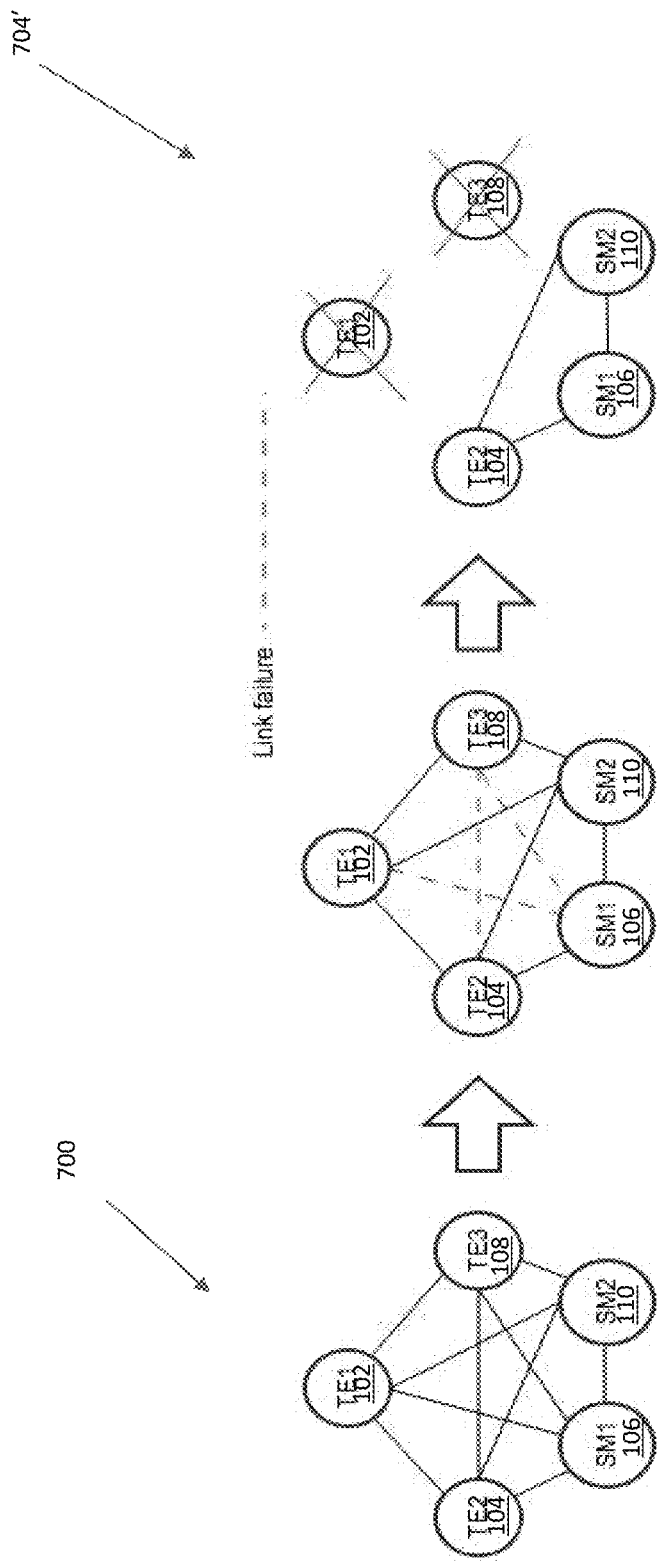
FIG. 7 illustrates an example distributed database system of five nodes with three link failures that can be resolved by the process shown in FIG. 1.

Example B4: FIG. 7 illustrates a distributed database system 700 with a chorus group of five nodes that have three link failures: one between TE1 and SM1 (link 212c), another one between TE2 and TE3 (link 212g), and another one between SM1 and TE3 (link 212j). These failures yield fully connected components {TE1, TE2, SM2}, {TE2, SM1, SM2}, and {TE1, SM2, TE3}; nodes TE1 and TE2 are partially connected. Each of these three fully connected components includes more than half the number of nodes in the chorus group before the link failures. Further, these three fully connected majority groups are of the same size. Therefore, the nodes implement a tie-breaking process, such as lexicographic ordering, to identify a winning fully connected component 704'. In this example, {TE2, SM1, SM2} is the winning fully connected component 704' (decided by the tie-breaking process). Therefore, nodes TE1 and TE3 fail themselves to resolve the network failure.

Figure 8:
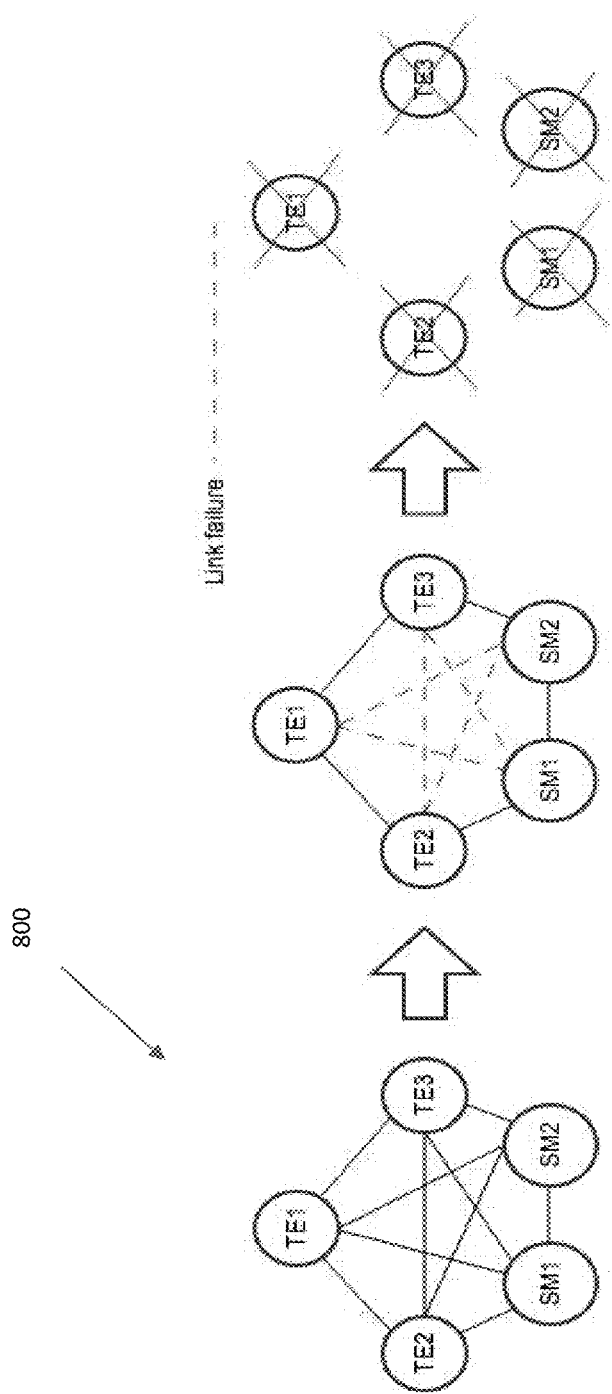
FIG. 8 illustrates an example distributed database system of five nodes with five link failures that can be resolved by the process shown in FIG. 1.

Example B5: FIG. 8 illustrates a distributed database system 800 chorus group of five nodes TE1, TE2, TE3, SM1, and SM2. In this example, five link failures occur: between TE1 and SM1 (link 212c), between TE1 and SM2 (link 212h), between TE2 and TE3 (link 212g), between TE2 and SM2 (link 212i), and between TE3 and SM1 (link 212j). As seen from FIG. 8, there are five fully connected group of nodes following these failures each of which are of a size of two nodes. This is less than more than half the number of nodes in the chorus group before the link failures. Therefore, all of the nodes fail themselves since there are no fully connected majority group after the link failures.

Figure 9:
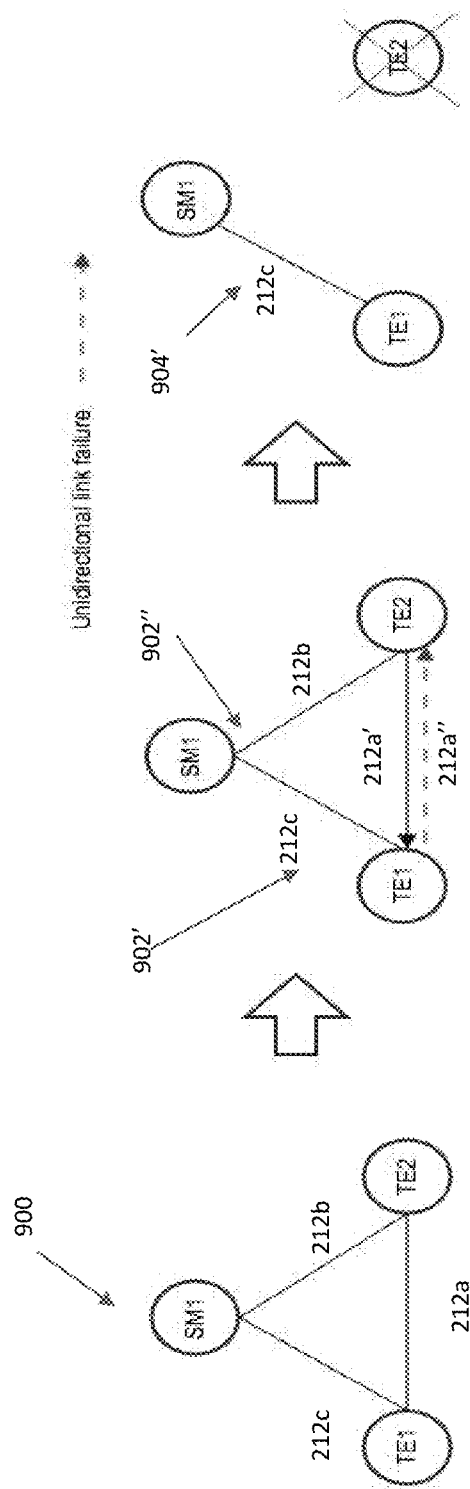
FIG. 9 illustrates an example case of special partial connectivity with unidirectional link failure that can be resolved by the process shown in FIG. 1.

Case C: FIG. 9 illustrates a special case of the partial connectivity, where a (unidirectional) link failure(s) permits a node or a set of nodes to communicate with a subset of other nodes in one direction but not the other. As seen in FIG. 9, three nodes TE1, TE2, and SM1 in the distributed database system 900 form a chorus group. However, there happens to be a unidirectional link failure between TE1 and TE2 (link 212a'') such that TE2 can send messages to TE1 (link 212a') but TE1 cannot send messages to TE2 (link 212a''). This unidirectional link failure (similar to the bidirectional link failure between TE1 and TE2) causes the creation of fully connected components 902' {TE1, SM1} and 902'' {TE2, SM1}. Since the two sets of fully connected components are of the same size and include more than half the number of nodes (i.e., 2 of the 3 total nodes) that were up before the link failure, the nodes implement a tie-breaking process to determine the winning fully connected component 904'. In this example, {TE1, SM1} is the winning fully connected component 904' (decided by the tie-breaking process presented above). Therefore, nodes TE1 and SM1 stay up and node TE2 fails itself.

Figure 10:
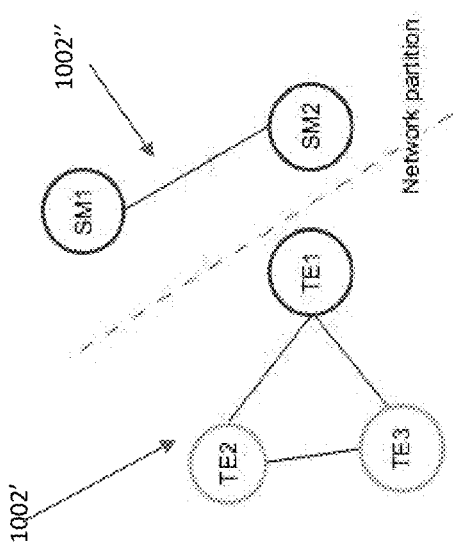
FIG. 10 illustrates an example case of network failures during membership changes that can be resolved by the process shown in FIG. 1.
Figure 10:
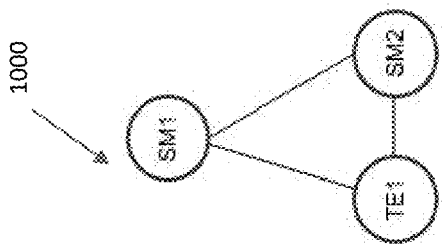

Case D: The process 100 also ensures that a distributed database system should not split into multiple majority groups due to network failures during membership changes. A membership change refers to a new node joining the distributed database system or an existing node of the distributed database system leaving the distributed database system. FIG. 10 illustrates an example of case D. In this example, the chorus 1000 starts with three nodes TE1, SM1 and SM2. Two nodes TE2 and TE3 try to join the chorus 1000. While they are in the process of joining, a network partition happens, separating the distributed database into fully connected components 1002' {TE2, TE3, TE1} and 1002'' {SM1, SM2}. Both groups can stay up because the members of group {TE2, TE3, TE1} think that they are part of the chorus {TE2, TE3, TE1, SM1, SM2} and so form a majority, and the members of group {SM1, SM2} think that they are part of the chorus {TE1, SM1, SM2} and so they also form a majority. The process 100 ensures that only one group stays up. Put differently, the process 100 ensures that both {TE2, TE3, TE1} and {SM1, SM2} do not stay up simultaneously.

Gathering and Sharing Information about Suspicious Nodes

The failure resolution processes (e.g., process 100) disclosed here are leaderless processes. In response to a network failure event, each node identifies its suspect list, exchanges connectivity information (its own and optionally that of other nodes) with other nodes, and then makes a failure resolution decision. The process makes the nodes communicate and exchange connectivity information in such a way that, upon the end of the communication phase of the process, each node should have enough connectivity information about other nodes in its partition to ensure that all nodes within a partition arrive at the same failure resolution decision(s). Any new network failure events that happen while the protocol is in progress causes all nodes to restart the protocol.

Generally, an inventive failure resolution process can include two phases: phase 1, during which each node gathers information about the suspect lists/connectivity of other nodes; and phase 2, during which each node makes a failure resolution decision (e.g., to fail itself) based on the information it gathered during phase 1.

During phase 1, each node participates in at most two rounds of coordinated broadcasts. These coordinated broadcasts of suspect list include exchanging the connectivity information/suspect lists among nodes within a partition. In case A presented above, each node does one coordinated broadcast. In cases B and C presented above, each node does two coordinated broadcasts. Two rounds of coordinated broadcasts are enough for all nodes to agree on group membership change in cases A, B, and C.

To make this process intuitive to follow, first, an unoptimized connectivity information exchange process is presented below that involves (n−1) rounds of broadcasts where n is the number of nodes in the chorus during phase 1. Following that, an optimized version of the connectivity information exchange process is presented below where each node participates in a maximum of two rounds of broadcasts, regardless of the number of nodes in the chorus.

For clarity and simplicity, we assume that there are no new network failure events, no new nodes that join, and no chorus member node failures while the connectivity information exchange process is in progress. However, the connectivity information exchange process described herein can be extended to all these events as well. These assumptions and/or restrictions are lifted in the later sections following the presentation of the core process.

Unoptimized Suspicious Node List Distribution

To begin, the chorus includes n fully connected nodes. Suppose a network failure event happens. Each node goes through the following protocol in order to resolve the network failure event.

Each node prepares its suspect list (the suspect list could be an empty list, which can happen if a node is (or at least thinks it is) fully connected to all other nodes after the network failure event).

Phase 1: Each node does (n−1) rounds of coordinated broadcasts in order to gather information about the suspect lists/connectivity of other nodes. In round 1, each node sends its suspect list to its neighbor nodes and waits until it receives the suspect lists of its neighbor nodes. In rounds 2 through (n−1), each node sends the suspect lists of other nodes that it received in the previous round to its neighbors and waits until it receives such information from its neighbors.

Phase 2: Each node has now received the connectivity information of all other nodes in its partition (since the chorus includes n nodes, nodes doing (n−1) rounds of broadcasts the way described above ensures that each node obtains the connectivity information of all other nodes in its partition). Each node prepares the connectivity graph for its partition and finds a fully connected component of maximum size (or a maximum clique) of the connectivity graph. If there is more than one such fully connected component, then the node chooses one fully connected component as the winning fully connected component, decided by a tie-breaking process (e.g., based on the lexicographic order of unique identifiers for the nodes in the fully component). If the winning fully connected component size is at least (n/2+1) and if the node is a member of the winning fully connected component, then the node decides to stay up (and exits the protocol); else, the node fails itself.

Below are optimizations that make the nodes agree on membership change after a maximum of two rounds of broadcasts.

Optimization 1: This is an optimization that is applicable in case of scenarios covered by case A (in the section above). This is based on the observation that if a network failure event divides a database into disjoint groups of fully connected nodes then the suspect lists of all nodes within a group/partition are going to be the same. For example, consider FIG. 2. In FIG. 2, nodes TE1, TE2, and SM1 suspect TE3 and SM2, and nodes TE3 and SM2 suspect TE1, TE2, and SM1. After the first round of coordinated broadcasts during phase 1, if the suspect list of a node matches with the suspect lists of all its neighbors, then the node can infer that (a) it is part of a fully connected component and (b) can identify the size of the fully connected component (which is equal to the chorus size minus the size of its suspect list). Therefore, all nodes can agree on membership change after the first round of broadcast during phase 1.

Optimization 2: This is an optimization that is applicable mainly in cases B and C above and partly in case A. In the unoptimized process, all nodes participate in (n−1) rounds of coordinated broadcasts. This makes each node aware of the connectivity information of all other nodes in its partition. But does each node really need to know the connectivity information of all other nodes in its partition in order to arrive at an optimal failure resolution decision? Consider dividing the nodes, based on their suspect lists after the network failure event, into two categories: Category (M) includes nodes that suspect less than n/2 other nodes; and category (N) includes nodes that suspect more than n/2 nodes. Nodes that suspect more than n/2 may fail themselves immediately rather than broadcast suspect lists because they cannot be part of a winning fully connected component.

Figure 11:
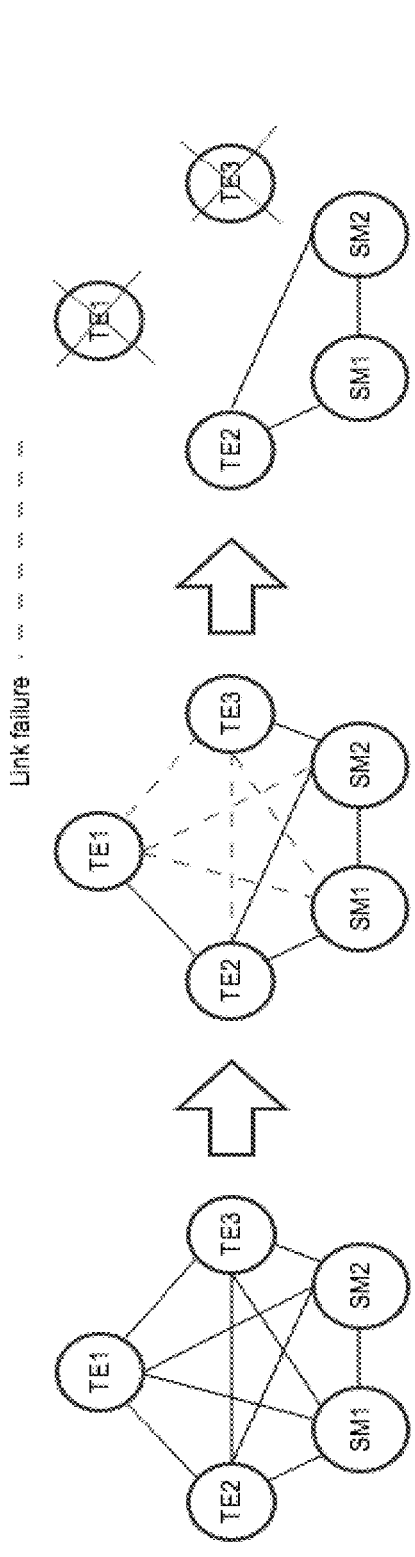
FIG. 11 illustrates an example of the process shown in FIG. 1.

For example, consider FIG. 11. After the network failure event, nodes TE2, SM1 and SM2 fall in category (M) and nodes TE1 and TE3 fall in category (N). Consider category (M): does a node in category (M) need to know about the connectivity information of other nodes in category (M) in order to make an optimal failure resolution decision? Yes. This is because a node in category (M) can form a fully connected component of size at least (n/2+1) together with other nodes in category (M), and knowing about the connectivity information of other nodes in category (M) helps it identify (a) whether it is a part of a fully connected component of size at least (n/2+1), (b) all fully connected components of size at least (n/2+1), and (c) whether it is a part of the winning fully connected component. Does a node in category (M) need to know about the connectivity information of nodes in category (N) in order to make an optimal failure resolution decision? No. This is because a node in category (M) can never form a fully connected component of size at least (n/2+1) together with a node in category (N), which in turn is because nodes in category (N) suspect more than (n/2) other nodes.

Now consider category (N): does a node in category (N) need to know about the connectivity information of nodes in category (M) and category (N) in order to make an optimal failure resolution decision? No. This is because a node in category (N) suspects more than (n/2) other nodes and so can never form a fully connected component of size at least (n/2+1) with any other node(s). Making the connectivity information of all other nodes will help a node in category (N) know which other nodes will stay up but doesn't change the fact that that node cannot form a fully connected component of size at least (n/2+1) with other nodes.

Therefore, enough rounds of coordinated broadcasts to make each node in category (M) aware of the connectivity information of each other node in category (M) in order for all nodes in the distributed database system to agree on the optimal failure resolution outcome should suffice. Therefore, as a modification to the unoptimized process, the optimized process begins with failing nodes in category (N) before the start of phase 1, but at the same time keeping them as members of the chorus. Put differently, the nodes in category (M) keep the nodes in category (N) on their node lists until phase 2 even though the nodes in category (N) fail themselves before phase 1 starts. Retaining the failed nodes (the nodes of category (N) that can be failed before the start of phase 1) as members of the chorus until phase 2 ensures correctness—the outcome of the failure resolution is a fully connected set having at least (n/2+1) nodes, where n includes nodes that were failed as an optimization before phase 1. (Omitting the category (N) nodes (or any type of node) may change the value of n (the group size) and the majority size and can make it harder to prove correctness of the outcome.)

Failing nodes in category (N) doesn't affect the connectivity between the nodes in category (M) (that is, nodes of category (M) do not become disconnected because of the failure of nodes of category (N)) because any two nodes in category (M) are either connected to each other directly or by another node of category (M). Thus, failing the category (N) nodes shouldn't affect the optimality of the failure resolution outcome.

Conceptually, the optimization basically makes nodes of category (M) reach a consensus on the failure resolution outcome and makes the nodes of category (N) follow that outcome. With this optimization, each node that starts phase 1 is connected to at least (n/2) other nodes, so the diameter of the connectivity graph (i.e., the maximum distance between any two nodes in the connectivity graph) is at most 2. Therefore, only two rounds of broadcasts are needed in order for each node that starts phase 1 to know about the connectivity of each other node that starts phase 1. The diameter of the connectivity graph is at most 2 because each node in phase 1 is connected to at least n/2 other nodes, so any two nodes are separated by at most one node.

Optimized Suspicious Node List Distribution

Consider a chorus that includes n fully connected nodes. Suppose a network failure happens. Each node goes through the following protocol to resolve the network failure. Each node prepares its suspect list (note: the suspect list could be an empty list, which can happen if a node is (or thinks it is) fully connected to all other nodes after the network failure event).

Phase 0: Each node checks if it suspects more than (n−½) other nodes. If so, the node fails itself. (Other nodes may hear about this failure while they are in phase 1. If so, those nodes restart the protocol and start from phase 0 again.)

Phase 1, round 1: Each node sends its suspect list to its neighbor nodes and waits until it receives the suspect lists of its neighbor nodes. As mentioned above, if one or more of a node's neighbors have failed in phase 0, the node may hear about those failures while it is waiting for its neighbors' suspect lists. On hearing about any such failure(s), the node restarts the protocol and starts from phase 0 again. This cause other nodes to restart the protocol too. Similarly, if a neighbor node restarts the protocol, the nodes start from phase 0 again. Also, as mentioned above, this node does not start failover for any failed nodes at this stage (i.e., it keeps every node in its chorus for purposes of determining the winning fully connected component). This is true even for multiple rounds of phase 0.

Each node checks if its suspect list is same as the suspect lists of all its neighbor nodes. If the node's suspect list matches the suspect lists of all its neighbor nodes, this indicates that the node is fully connected with its neighbor nodes. This scenario is covered in case A above (e.g., FIG. 2). Since each node that starts phase 1 is connected to at least (n/2) other nodes, the node's neighbor list size can be at least (n/2) (the node together with its neighbors form a group including at least (n/2+1) nodes). The node decides to stay up and exits the protocol.

If the node's suspect list doesn't match with the suspect list of at least one of its neighbors: it indicates that the node is not fully connected with all other nodes in its partition. This scenario is covered in cases B and C above (e.g., FIGS. 3-9). Such a node cannot decide whether to stay up or not based on the information it has received in round 1. Therefore, it implements phase 1, round 2.

Phase 1, round 2: Each node sends the suspect lists of other nodes that it received in round 1 to its neighbors and waits until it receives such the suspect lists of its neighbors' neighbors from its neighbors.

Phase 2: Each node has now received the connectivity information of all other nodes in its partition. Each node prepares the connectivity graph for its partition and finds the largest fully connected component with at least (n/2+1) nodes (or a maximum clique of size at least (n/2+1)) of the connectivity graph. If there is more than one fully connected component (e.g., as in FIG. 7) then the node chooses one fully connected component as a winning fully connected component, decided by the tie-breaking process (e.g., lexicographic order) in order to make failure resolution deterministic. If the node is a member of the winning fully connected component then the node decides to stay up (and exits the protocol); else, the node fails itself.

If a new network failure event happens while the distributed database system is in the process of resolving a network event, then the protocol causes the nodes to backtrack, re-examine the node connectivity by taking the effects of the new network events into account, and then make a failure resolution decision.

In addition to new network failure events, node failures (for example, caused due to manual shutdown of nodes) may also happen while the nodes in the distributed database system are resolving a network failure. In response to node failures, the protocol causes the nodes to restart from phase 0 while keeping the failed nodes as members of the chorus until phase 2 (by not running fail over for the failed nodes, thereby stopping the remaining nodes from removing the failed nodes from their node lists). As explained above, retaining the failed nodes as members of the chorus until phase 2 ensures correctness—the outcome of the failure resolution is a fully connected set having at least (n/2+1) nodes, where n includes nodes that have failed, so there can be only one such set that stays up after phase 2.

Figure 12:
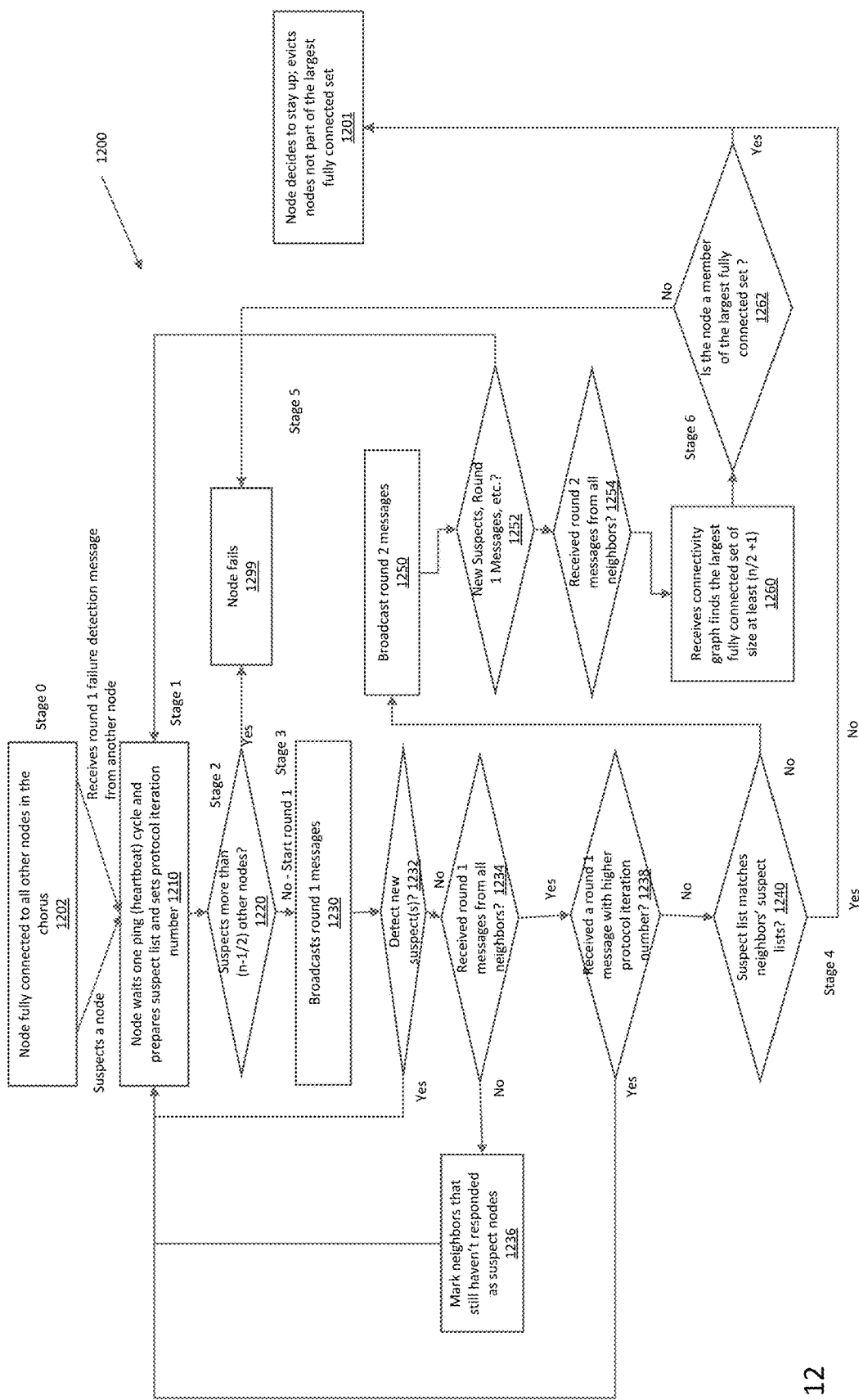
FIG. 12 is a flowchart illustrating an expanded process of resolving network failures.

FIG. 12 is a flowchart illustrating an optimized process 1200 to resolve network failures. Each node follows the same process, so the flowchart shows the process 1200 from the perspective of a single node. The process 1200 is detailed in terms of stages.

Stage 0: The initial stage. At 1202, the node is fully connected to all other nodes in the chorus. Detection of suspect nodes, either locally or remotely, causes the node to move to stage 1.

Stage 1: At 1210, the node waits one ping (heartbeat) cycle for additional ping (heartbeat) timeouts to happen, prepares its suspect list, consumes any suspect list messages it has received, and then enters stage 2.

Stage 2: At 1220, the node checks if it suspects more than (n−½) other nodes (where n is the number of nodes in the chorus). If so, at 1299, the node fails itself. If not, the node checks if it has any new suspects since preparing its suspect list in stage 1. Also, the node checks if any of its neighbors have detected new suspects and so have restarted the protocol. Each node may assign a number, called protocolIterationNumber, for each iteration of the process 1200 that it runs. Each node sets this number in the suspect list messages that it sends and compares its local protocolIterationNumber with the protocolIterationNumber in the suspect lists that it receives from other nodes. If a node determines that its protocolIterationNumber is lower than a neighbor's protocolIterationNumber, it determines that its neighbor has restarted the process and goes back to stage 1. Otherwise, the node enters stage 3. (If a node's protocolIterationNumber is higher than a neighbor's protocolIterationNumber, the node has restarted the protocol (possibly due to finding new suspects), which should cause the neighbor to restart the protocol too.)

Stage 3: At 1230, the node broadcasts its round 1 suspect list to its neighbor nodes. The node may detect new suspects or may hear that one or more of its neighbors detected new suspects while it is waiting for round 1 suspect list messages at 1232. If so, the node stops waiting for any more responses, and goes back to stage 1. At 1234, the nodes receives round 1 suspect list messages from all of its neighbor nodes. If the node does not receive responses from any of its neighbors in a timely manner (e.g., within a predetermined period), then at 1236, the node marks such neighbors as suspects and goes back to stage 1. If the node receives a round 1 suspect list with a higher protocolIterationNumber than its protocolIterationNumber, then at 1238, the node returns to the beginning of stage 1. On receiving round 1 responses from all of its neighbors, the node enters stage 4.

Stage 4: At 1240, if the node's suspect list matches with the suspect lists of all its neighbors, then the node determines that it is fully connected with its neighbor nodes (e.g., as in FIG. 2). Since each node that starts stage 3 is connected to at least (n/2) other nodes, the node's neighbor list size can be at least (n/2) (i.e., the node and its neighbors form a fully connected component or group including at least (n/2+1) nodes). At 1201, the node decides to stay up, evicts the suspect nodes, and exits the process 1200.

If the node's suspect list doesn't match the suspect lists of at least one of its neighbors, then the node is not fully connected with all other nodes in its partition (e.g., as in FIGS. 3-9). The node cannot decide whether to stay up or fail based on the information it received in round 1, so the node enters stage 5, which involves broadcasting round 2 suspect list messages at 1250.

Stage 5: At 1250, the node broadcasts its round 2 suspect list, which includes its original suspects plus its neighbor nodes' suspects, to its neighbor nodes and waits till it receives round 2 suspect list messages from all its neighbor nodes. The node may receive round 2 suspect list messages from the other nodes any time after it broadcasts its round 1 suspect list message at 1230. The node accumulates these round 2 suspect list messages. At 1252, if a new network failure happens, if the node receives a round 1 message from another node, or if the node hears about the failure of another node, then the node goes back to stage 1. Upon going back to stage 1, the node discards all accumulated round 2 suspect list messages. But if another node went back and sent another message then that message would be retained. The node distinguishes between these two types of messages based on the protocolIterationNumber in the round 1 and round 2 suspect list messages. Put differently, the messages based on the protocolIterationNumber include the protocolIterationNumber and the round number.

At 1254, upon receiving round 2 suspect list messages from all its neighbor nodes the node enters stage 6. If a new network event happens or if the node hears about the failure of another node after the node broadcasts its round 2 suspect list message, then the failure resolution decision may not be an optimal one. There are at least two possible cases: in case (a), the node has already received the round 2 message from the new suspect node or the failed node; and in case (b), the node has not received the round 2 message from the new suspect or from the failed node.

In case (a) the node could move on to stage 6, do the failure resolution for the current network event, and then handle the new network event by restarting the protocol, or go back to stage 1 (without resolving the current network event) and then restart the process 1200. (which would then resolve both the current and new network failures). In case (b), the node does not receive round 2 message from the new suspect or the failed node, so the node goes back to stage 1. But there is no guarantee that the other nodes will also go back to stage 1 before completing stage 6 (because they may have received round 2 message from the new suspect or the failed node). The outcome of failure resolution could be sub-optimal (that is, the surviving set will be smaller than what it could have been, but there will still be only one surviving set) in this case. But moving this node to stage 1 does not stop other nodes from making progress because this node has already sent its round 2 message.

Stage 6: At 1260, the node prepares the connectivity graph for its partition and finds the largest fully connected component of size at least (n/2+1) (or a maximum clique of size at least (n/2+1)) of the connectivity graph. If there is more than one such component then the node chooses one from among them, decided by the tie-breaking process, as a winning fully connected component. If the node is a member of the winning fully connected component, then at 1201, the node decides to stay up and evicts nodes that are not part of the winning fully connected component. If not, at 1299, the node fails itself.

Protocol Iteration Number

As discussed above, any node in the distributed database system can start the failure resolution protocol (e.g., process 1200 in FIG. 12) in response to detecting one or more suspect nodes. And any new network failure events that happen during the execution of a failure resolution protocol triggers a restart of the protocol. In order to enable nodes to detect whether a suspect list message (either round 1 or round 2) they receive belongs to the current invocation of the protocol or the following invocation due to the restart of the protocol (or even the previous invocation of the protocol in case of nodes that have restarted the protocol), the nodes associate a number, called protocolIterationNumber, with each invocation of the failure resolution protocol.

Each node maintains its local protocolIterationNumber and sets this number in the suspect list messages that it sends, and each node compares its local protocolIterationNumber with the protocolIterationNumber in the suspect list messages that it receives. If the numbers match, the node infers that the suspect list message that it received corresponds to the current invocation of the protocol. If the protocolIterationNumber in the suspect list message that it received is higher than its own protocolIterationNumber, then the node infers that the sender has initiated a restart of the protocol (and so restarts the protocol). And if the protocolIterationNumber in the suspect list message that it received is lower than its own protocolIterationNumber, then the node infers that the sender is still running the previous iteration of the protocol and so ignores the message.

Each node can maintains its local protocolIterationNumber in the following way:
  (a) ProtocolIterationNumber is set to zero on the first node during database initialization and during database restart.
  (b) ProtocolIterationNumber is serialized as part of the master catalog, and new nodes that join the distributed database system receive the current protocolIterationNumber from the master catalog chairman when they fetch the master catalog. The new node receives the master catalog when it joins the distributed database system. By storing the current protocolIterationNumber in the master catalog, the current protocolIterationNumber is made available to the new node.
  (c) If a node was not suspecting any node, has detected suspect nodes, hasn't received any suspect list messages from other nodes, and is invoking the failure resolution protocol then the node increments its protocolIterationNumber.
  (d) If a node was not suspecting any node, has detected suspect nodes, has received one or more suspect list messages from other nodes, and is invoking the failure resolution protocol then the node sets its protocolIterationNumber to the highest protocolIterationNumber in the suspect list messages that it received.
  (e) If a node has not detected suspect nodes, has received one or more suspect list messages from other nodes, and is invoking the failure resolution protocol then the node sets its protocolIterationNumber to the highest protocolIterationNumber in the suspect list messages that it received from other nodes.
  (f) If a node is running the failure resolution protocol, has not received a suspect list message with a protocolIterationNumber that is higher than its local number, and detects a new network failure event then it increments its protocolIterationNumber (and restarts the protocol).
  (g) If a node is running the failure resolution protocol, has received a suspect list message with a protocolIterationNumber that is higher than its local number, and detects a new network failure event then it sets its local protocolIterationNumber to the number in the suspect list message that it received (and restarts the protocol).
  (h) If a node is running the failure resolution protocol, has received a suspect list message with a protocolIterationNumber that is higher than its local number, and has not detected a new network failure event then it sets its local protocolIterationNumber to the number in the suspect list message that it received (and restarts the protocol).
  (i) If a node is running the failure resolution protocol and receives a suspect list message with a protocolIterationNumber that is lower than its local number, then the node ignores that message.

These points can be summarized as follow:
  (A) ProtocolIterationNumber is set to zero on the first node during database initialization and during database restart.
  (B) ProtocolIterationNumber is serialized as part of the master catalog, and new nodes that join the database receive the current protocolIterationNumber from the master catalog chairman when they fetch the master catalog.
  (C) If a node is invoking the failure resolution protocol (either because it has detected suspects nodes and/or it has received suspect list messages from other nodes) then the node checks if it has received a suspect list message with a protocolIterationNumber that is higher than its local protocolIterationNumber. If so, the node sets its local protocolIterationNumber to the highest protocolIterationNumber in the suspect list message(s) that it received, else it increments its protocolIterationNumber.

Handling Unidirectional Link Failures

Unidirectional link failures such as case D presented above (FIG. 10) can be resolved by handling them as bidirectional link failures (i.e., by making the nodes on both sides of a failed link suspect each other). For instance, consider two nodes—node A and node B—in a distributed database system. Assume that node A can send messages to node B, but node B cannot send messages to node A. Since A can send ping messages to node B but does not receive any acknowledgement message from node B, node A begins to suspect node B. At this point, node B does not yet suspect node A. However, since node A begins to suspect node B, it stops sending ping messages to node B. This causes node B to suspect node A, thereby converting a unidirectional link failure to a bidirectional link failure.

In the processes described herein, a node sends a MsgPing message (e.g., ping message) and sets Node::lastPingTime for a particular node only if that node has acknowledged the previous MsgPing message. This ensures that a unidirectional link failure causes the nodes on both sides of the link to suspect each other. Hence the protocol presented above can resolve unidirectional link failures or a mix of unidirectional and bidirectional link failures.

Chorus Membership Changes

If a network failure event happens while a new node (or a set of new nodes) is (are) in the process of joining a chorus, the process should ensure that the chorus won't split into multiple majority groups. In FIG. 10, for example, a network partition splits the chorus into a majority group {SM1, SM2} and a minority group {TE1}. But the minority group {TE1} together with new nodes {TE2, TE3} forms a majority group {TE1, TE2, TE3}, resulting in two "majority" groups {TE1, TE2, TE3} and {SM1, SM2}.

One way to solve problems associated with joining new nodes to a chorus is by failing the new node(s) if a network failure event happens while the new node(s) is (are) in the process of joining the chorus. This prevents a minority set of nodes in the current chorus from forming a majority group with the new node(s). In FIG. 10, the new nodes TE2 and TE3 (that are still in the process of joining the chorus) can be failed, which causes TE1 to fail too, leaving the database with a single majority group {SM1, SM2}. In this process, there is no restriction on the number of nodes that can join the chorus at the same time. However, since new node(s) are failed and some of the nodes in the current chorus may be aware of the new node(s), this process may affect the availability of the system (depending on the number of nodes, odd or even, in the current chorus, number of nodes that are trying to join the chorus, number of nodes in the chorus that are aware of the new node(s) at the time of the network failure, etc.).

This process can also piggyback on processes for requesting fragments of data in the distributed database (the originator sending available fragments, peers sending acknowledgments to the originator, and the originator sending the complete data to the requester) in order to make the current chorus members agree on a new node joining the chorus. This process involves the following change to the failure resolution process 1200 in FIG. 12 in order for nodes to agree on chorus size during the node join process:

Nodes exchange their complete connectivity information (that is, their neighbor node lists together with their suspect node lists) during the round 1 and round 2 broadcasts. The nodes compare their suspect and neighbor node lists with their neighbors' suspect and neighbor node lists in response to receiving round 1/round 2 messages. If a node finds that its neighbor knows about $n_j$ nodes that it doesn't know about, then it increments its chorus size by $n_j$ and restarts the process.

This process can ensure correctness: if a new node(s) cannot get into the node lists of all nodes in a chorus due to a network partition, then that new node(s) fails itself during failure resolution. If n is the number of nodes in a chorus and $n_j$ is the number of nodes that are trying to join the chorus at the same time but that cannot get into the node lists of all n nodes due to a network partition, then $n_j$ nodes (the new nodes) fail themselves while running the process irrespective of their partition. So a maximum of n nodes check if they are in a majority partition, after round 1, in order to decide whether to stay up or not. Since nodes in each partition run with a chorus size s ($n \le s \le n+n_j$) and that there are a maximum of n nodes in the chorus after round 1, at most one partition can form a majority group, and that ensures correctness.

But what if all nodes within a partition add a new node(s) to their node list after they start the failure resolution protocol? (Note that nodes prepare their suspect and neighbor node lists when they start the protocol, during stage 1, and cache that information). None of the nodes can detect that a new node(s) has been added to their node list. As a result, the master catalog of the new node(s) can transition to a complete state, causing the new node(s) to participate in the failure resolution process, which can result in multiple majority groups.

For example, consider this scenario: A chorus includes nodes A, B, and C, and A is the chairman/leader of a fragment of the distributed database (e.g., fragment "master catalog"). New nodes D and E try to join the chorus at the same time. Node A sends available messages for D and E to B and C. B and C don't receive ping messages from A, suspect A, and start the protocol. B and C haven't applied the available messages from A (yet), so start the protocol with chorus members {A, B, C}. Then B and C apply the available messages, send acknowledgment messages to A, and then the network split happens. The master catalog on D and E becomes complete, so A, D, and E start the protocol with chorus members {A, B, C, D, E}. Both groups {A, D, E} and {B,C} think that they can form a majority group.

The following extension can prevent such a situation: After applying an available message (or after sending the master catalog to a new node, in the case of the chairman node), a node restarts the failure resolution protocol (if one is in progress), which causes the node to invalidate its cached suspect and neighbor lists and recompute them with a larger chorus size.

FIGS. 13-18 illustrate some example failure scenarios and how the inventive failure resolution processes handle them.

Scenario (A): A network partition happens separating the new node and the entry node (the originator of the master catalog) from the rest of the nodes.

Figure 13:
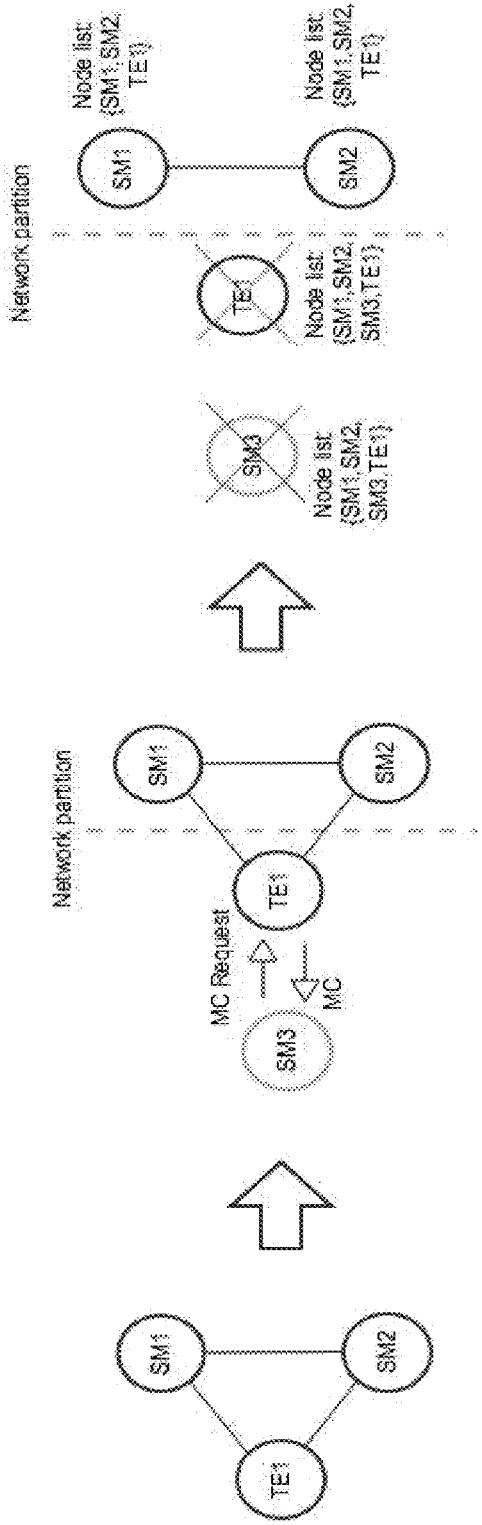
FIG. 13 shows a membership change in a distributed database system when a network partition separates a new node and an entry node from the rest of the nodes in the distributed database system.

In FIG. 13, SM3 requests and receives the master catalog from TE1 (the chairman of the master catalog) and a network partition happens before TE1 sends MsgObjectAvailable (e.g., a message that tells the receiver node that the sender node is joining the distributed database system) to SM1 and SM2. All nodes, including SM3, start the resolution protocol. SM3 and TE1 suspect nodes SM1 and SM2, and SM1 and SM2 suspect TE1 (SM1 and SM2 don't know about SM3). SM3 fails because it is still in the process of joining the chorus (it hasn't received complete from TE1), TE1 fails (in phase 0) because it suspects two nodes in the chorus {SM1, SM2, SM3, TE1}, and SM1 and SM2 stay up because they form a majority in the chorus {SM1, SM2, TE1}.

Scenario (B): A variation of scenario (A). A network partition happens separating the new node and the entry node (the originator of the master catalog) from the rest of the nodes.

Figure 14:
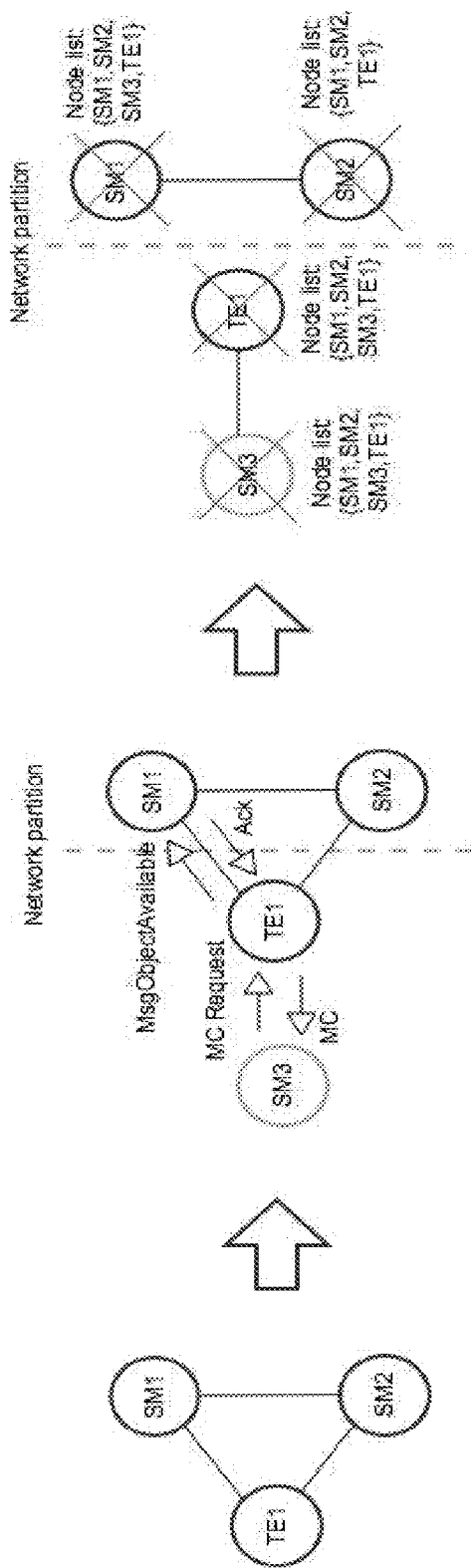
FIG. 14 is a variation of the scenario in FIG. 13 when a network partition separates the new node and the entry node from the rest of the nodes in the distributed database system.

In FIG. 14, SM3 requests and receives the master catalog from TE1 (the chairman of the master catalog), SM1 receives MsgObjectAvailable from TE1, and a network partition happens before SM2 receives MsgObjectAvailable from TE1, SM3 and TE1 suspect SM1 and SM2, SM1 suspects SM3 and TE1, and SM2 suspects TE1 (SM2 doesn't know about SM3). SM3 fails because it is still in the process of joining the chorus (it hasn't received final confirmation of joining from TE1), TE1 and SM1 fail (in phase 0) because they suspect two nodes in the chorus {SM1, SM2, SM3, TE1}. SM2 initially suspects only TE1 (which is less than n/2 number of nodes where n=3) and so doesn't fail in phase 0, and sends phase 1, round 1 message to SM1 but after hearing about the failure of SM1 it restarts the resolution protocol and then fails itself.

Scenario (D): A network partition happens separating the new node, the entry node, and some peers from the rest of the peers.

Figure 15:
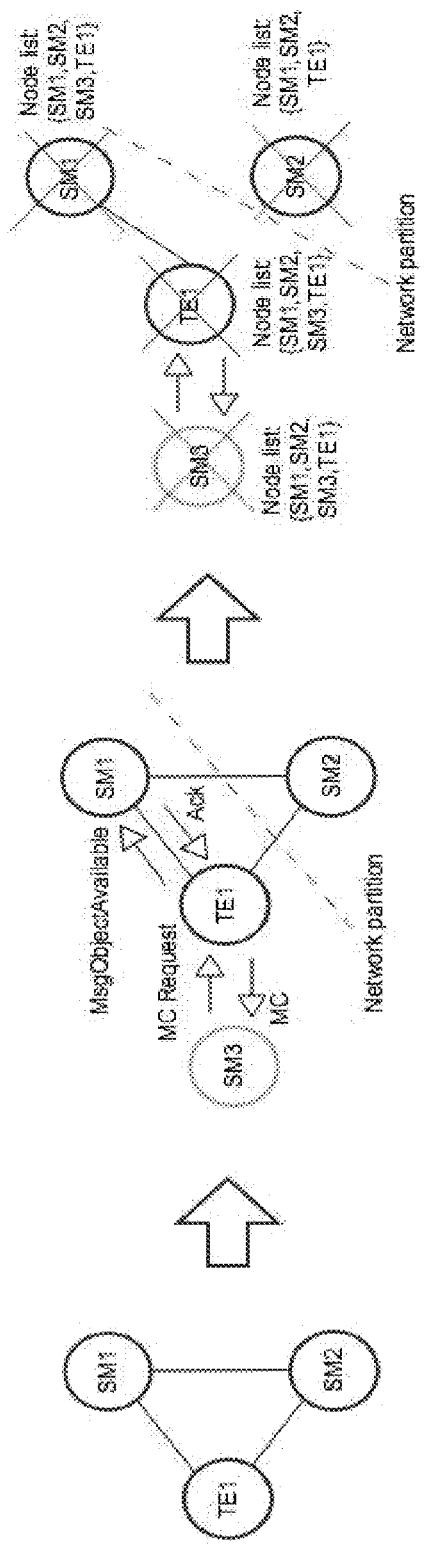
FIG. 15 shows a membership change in a distributed database system when a network partition separates a new node, an entry node, and some peers from the rest of the peers in the distributed database system.

In FIG. 15, SM3 requests and receives the master catalog from TE1 (the chairman of the master catalog), SM1 receives MsgObjectAvailable from TE1, and a network partition separates SM2 from the rest of the nodes before SM2 receives MsgObjectAvailable from TEL SM3 fails because it is still in the process of joining the chorus (it hasn't received complete from TE1). SM2 fails because it is in a minority partition in the chorus {SM1, SM2, TE1}. TE1 and SM1 start the protocol, don't receive a (round 1) response from SM3, eventually suspect SM3, and then fail themselves.

Scenario (E): A network partition separates the entry node (the chairman of the master catalog) from the rest of the nodes.

Figure 16:
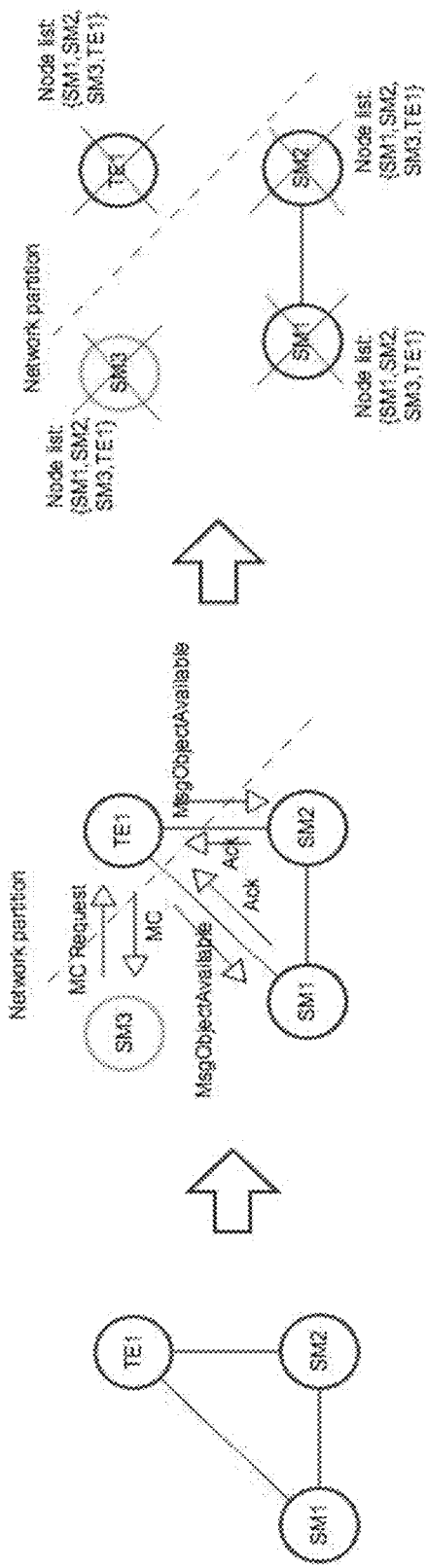
FIG. 16 shows a membership change in a distributed database system when a network partition separates an entry node from the rest of the nodes in the distributed database system.

In FIG. 16, SM3 requests and receives the master catalog from TE1 (the chairman of the master catalog), SM1 and SM2 receive MsgObjectAvailable from TE1, and a network partition partitions the entry node, TE1, from the rest of the nodes. SM3 fails because it is still in the process of joining the chorus. TE1 fails because it is in a minority partition in the chorus {SM1, SM2, SM3, TE1}. SM1 and SM2 start the failure resolution process, don't receive a response from SM3, eventually suspect SM3, and then fail themselves.

Scenario (H): A network partition separates the new node, the entry node, and some peers from the rest of the nodes.

Figure 17:
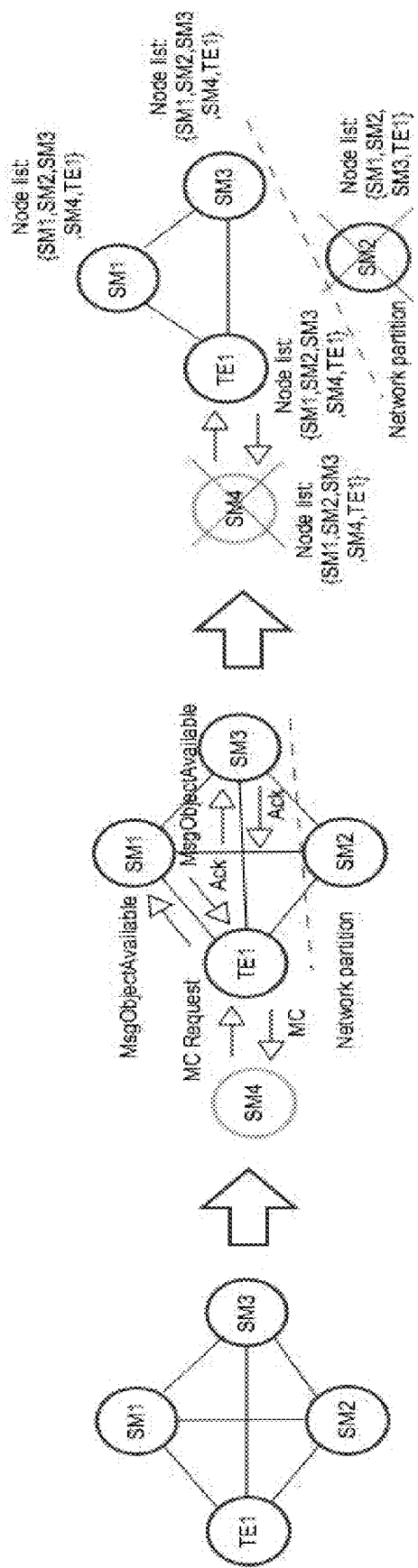
FIG. 17 shows a membership change in a distributed database system when a network partition separates a new node, an entry node, and some peers from the rest of the nodes in the distributed database system.

In FIG. 17, SM4 requests and receives the master catalog from TE1 (the chairman of the master catalog), SM1 and SM3 receive MsgObjectAvailable from TE1, and a network partition happens separating SM2 from the rest of the nodes. SM4 fails because it is still in the process of joining the chorus. SM2 fails because it is in a minority partition in the chorus {SM1, SM2, SM3, TE1}. TE1, SM1, and SM3 stay up because they form a majority group in the chorus {SM1, SM2, SM3, SM4, TE1}. In this case, the group {TE1, SM1, SM3} was a majority in the original chorus {TE1, SM1, SM2, SM3} and is still a majority in the new chorus {TE1, SM1, SM2, SM3, SM4}. This allows TE1, SM1, and SM3 to stay up even after SM4 has been added to their node lists. In general, this behavior occurs whenever the chorus size changes from even number of nodes to odd number of nodes (with one node trying to join the chorus at the time of the network failure).

Scenario (I): A network partition divides the new nodes, the entry node, and some peers from the rest of the nodes.

Figure 18:
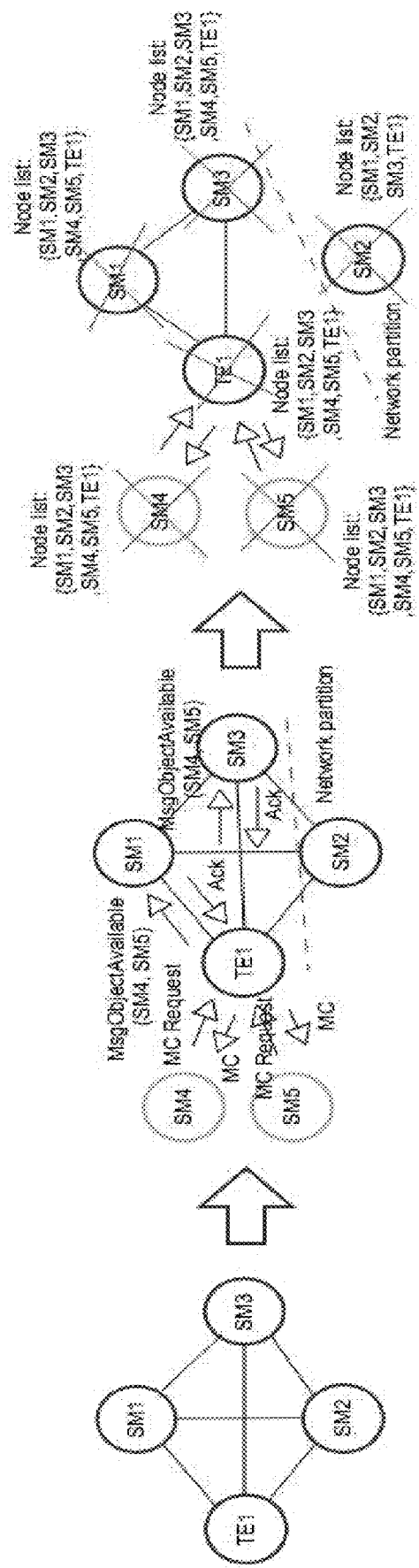
FIG. 18 is another illustration of a membership change in a distributed database system when network partition separates a new node, an entry node, and some peers from the rest of the nodes in the distributed database system.

In FIG. 18, SM4 and SM5 request and receive the master catalog from TE1 (the chairman of the master catalog), SM1 and SM3 receive MsgObjectAvailable from TE1 for both SM4 and SM5, and a network partition separates SM2 from the rest of the nodes. SM4 and SM5 fail because they are still in the process of joining the chorus, SM2 fails because it is in a minority group in the chorus {SM1, SM2, SM3, TE1}. TE1, SM1, and SM3 also fail because they form a minority group in the chorus {SM1, SM2, SM3, SM4, SM5, TE1}. The nodes TE1, SM1, and SM3 that stayed up in scenario (H) fail here because there are two nodes trying to join the chorus, which causes these nodes to become a minority group in the new chorus.

Conceptually, a chorus with n nodes can tolerate a network partition that separates a maximum of $(n-(n/2+1))$ nodes from the rest of the nodes in the chorus (or the simultaneous failure of up to $(n-(n/2+1))$ nodes in the chorus) and still stay up. If a single node is trying to join the chorus, the chorus can tolerate the separation of $(n-(n/2+1)-1)$ nodes and still stay up if n is odd. For a single new node, the chorus can tolerate the separation of $(n-(n/2+1))$ nodes and still stay up if n is even.

Let the failure tolerance of a chorus be the maximum number of nodes failures that the chorus can tolerate without all of the nodes in the chorus failing. In a chorus with n nodes, if there are no new nodes joining the chorus, then the chorus's failure tolerance is $(n-(n/2+1))$ (column 1 in TABLE 1). If there is a single node that is trying to join the chorus, the chorus's fault tolerance falls to $(n-(n/2+1))$ if n is odd and remains at $(n-(n/2+1))$ if n is even (column 2 in TABLE 1). If the number of new nodes that are trying to join the chorus (at the same time) is greater than one, then the failure tolerance of the chorus may be reduced further. TABLE 1 summarizes the failure tolerance of a chorus for various number of nodes in the chorus (n) and various of number of nodes ($n_j$) that are trying to join the chorus at the same time:

In the TABLE 1 below, there are $n_j$ nodes trying to join the chorus at the same time and at least one node in the majority partition has received MsgObjectAvailable for all $n_j$ nodes.

not captured by TABLE 1 because none of the nodes in the majority group in Scenario A received MsgObjectAvailable. Scenario H is captured by the entry with n=4 and $n_j$=1. The chorus failure tolerance in Scenario H is one. Since the chorus has a single node in the minority partition, the chorus stays up. Scenario I is captured by the entry with n=4 and $n_j$=2. The chorus failure tolerance in this configuration is zero, so a network partition while the nodes are joining causes the entire chorus to fail.

Handling Node Failures

The present section discusses handling one or more node failures (or shutdowns) while a distributed database system is resolving a network failure. As discussed above, the process of resolving a network failure event involves nodes exchanging failure detection messages, nodes deciding whether to stay up or not based on the exchanged messages, and the nodes that decide to stay up running failover for the suspect nodes. This process is illustrated in FIG. 19.

Figure 19:
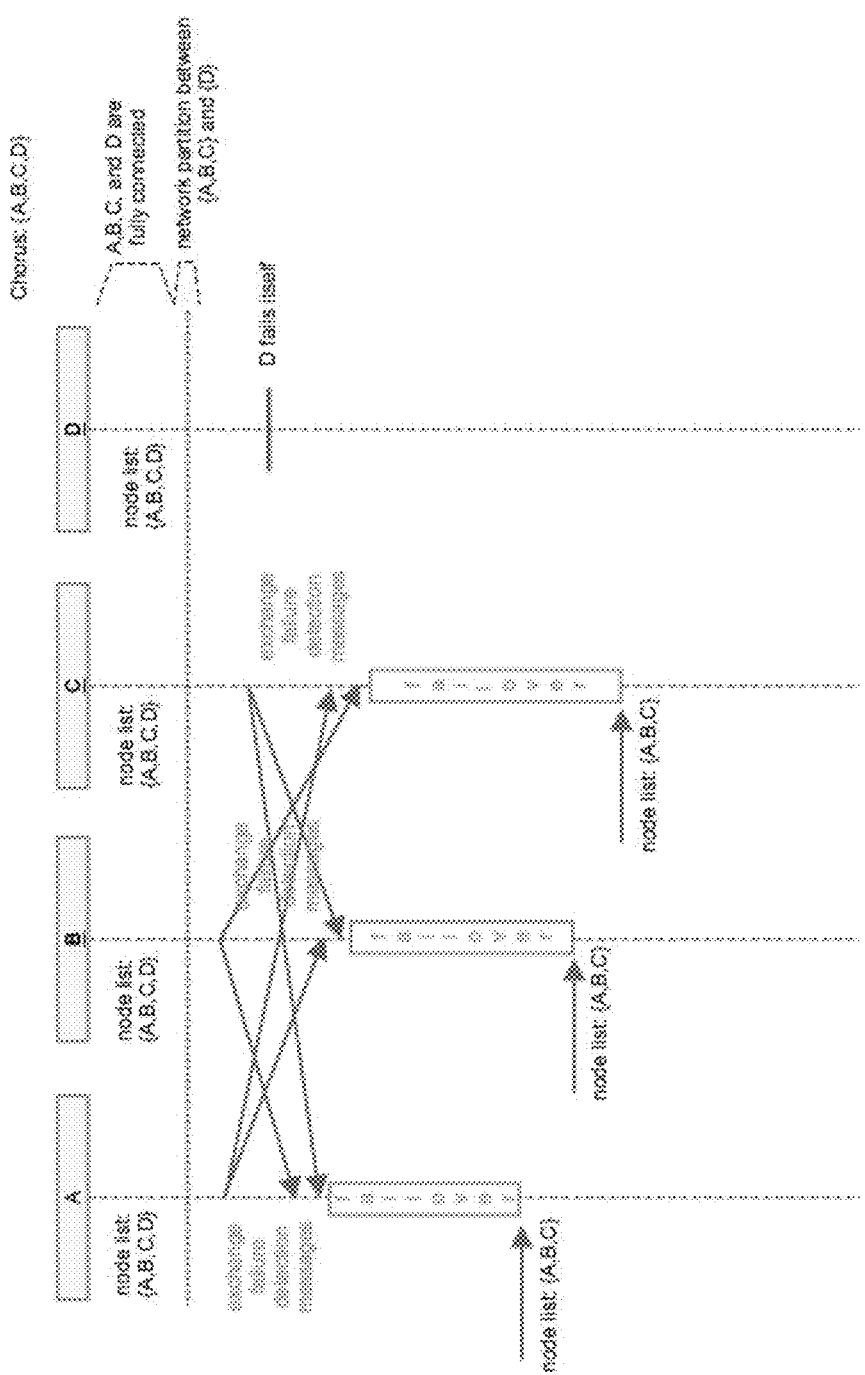
FIG. 19 illustrates resolving a network failure event with nodes exchanging failure detection messages.

In FIG. 19, the chorus includes members {A, B, C, D}. A network partition separates {A, B, C} from D. Nodes A, B, and C suspect node D, exchange failure detection messages, decide to stay up, and run failover for D. Node D suspects nodes A, B, and C, starts the failure resolution protocol, and fails itself.

When a ping (heartbeat) timeout is enabled, node failures cause neighbors of the failed nodes to start (or restart) the failure resolution protocol, agree on evicting the failed nodes, and evict the failed nodes from the chorus. If node failures happen while a distributed database system is in the process of resolving a network failure event, the failed nodes may show up as new suspects for the neighbors of the failed nodes. This can cause the neighbors to restart the protocol. Therefore, there is no special mechanism to handle node failures during partition resolution. Instead, the processes described herein ensure that the nodes that start/restart the failure resolution protocol in response to node failures agree on chorus membership.

Handling Node Failures while Exchanging Failure Detection Messages

When a node fails while exchanging failure detection messages, it won't be on its neighbors' lists of suspect nodes. As a result, the neighbor nodes will have the same view of the chorus membership/chorus size as in the process discussed above. In response to detecting a new suspect caused by the node failures, the neighbors will restart the failure resolution process with an updated suspect list. This updated suspect list is the union of the suspect nodes caused

TABLE 1

|  | $n_j = 0$ | $n_j = 1$ | $n_j = 2$ | $n_j = 3$ | $n_j = 4$ | $n_j = 5$ | $n_j = 6$ | $n_j = 7$ | $n_j = 8$ |
| --- | --- | --- | --- | --- | --- | --- | --- | --- | --- |
| n = 3 | 1 | 0 | 0 | 0 | 0 | 0 | 0 | 0 | 0 |
| n = 4 | 1 | 1 | 0 | 0 | 0 | 0 | 0 | 0 | 0 |
| n = 5 | 2 | 1 | 1 | 0 | 0 | 0 | 0 | 0 | 0 |
| n = 6 | 2 | 2 | 1 | 1 | 0 | 0 | 0 | 0 | 0 |
| n = 7 | 3 | 2 | 2 | 1 | 1 | 0 | 0 | 0 | 0 |
| n = 8 | 3 | 3 | 2 | 2 | 1 | 1 | 0 | 0 | 0 |
| n = 9 | 4 | 3 | 3 | 2 | 2 | 1 | 1 | 0 | 0 |
| n = 10 | 4 | 4 | 3 | 3 | 2 | 2 | 1 | 1 | 0 |

The failure resolution in Scenarios B, D, and F (presented above) is captured by the table entry with n=3 and $n_j$=1. The chorus failure tolerance in this configuration is zero, so a network partition (or any node failure) while a new node is joining (with at least one of the nodes receiving MsgObjectAvailable) causes the entire chorus to fail. Scenario A is by the network failure and the failed nodes. The neighbors will stay up if they form a majority group based on the updated suspect list.

Figure 20:
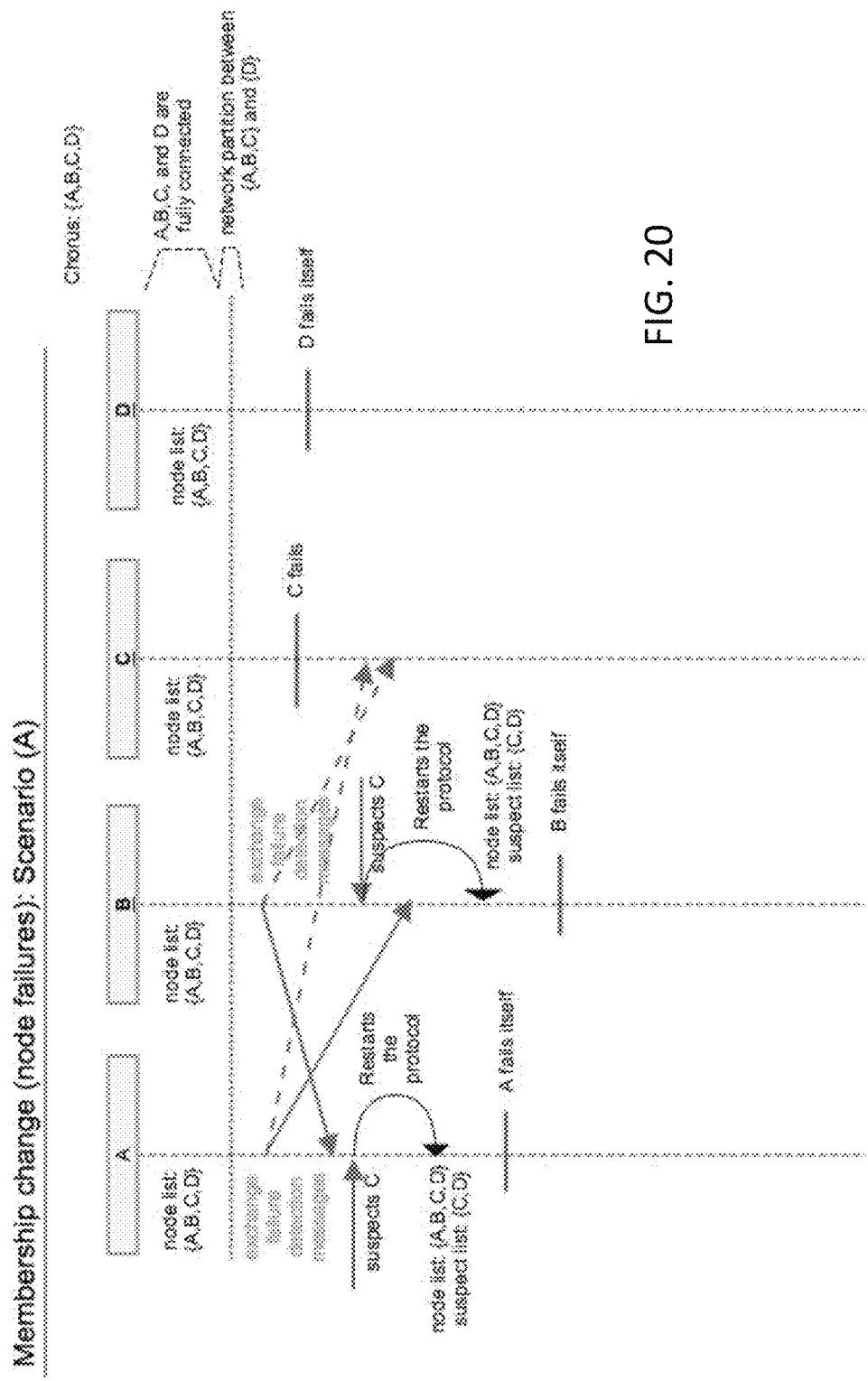
FIG. 20 illustrates handling node failures while exchanging failure detection messages.

In FIG. 20, a network partition separates {A, B, C} from D, and node C fails while the nodes are exchanging messages. Nodes A and B restart the protocol upon suspecting C. A and B fail because they don't form a majority group in the chorus {A, B, C, D}.

Handling Node Failures while Running Failover

When a node fails while the nodes are running failover (removing failed nodes from the chorus membership list), its neighbors may have started or completed failover for other suspect nodes. As a result, the neighbors may have removed one or more suspect nodes from their node lists, so the neighbors may not agree on chorus membership/chorus size upon start/restart of the protocol.

Figure 21:
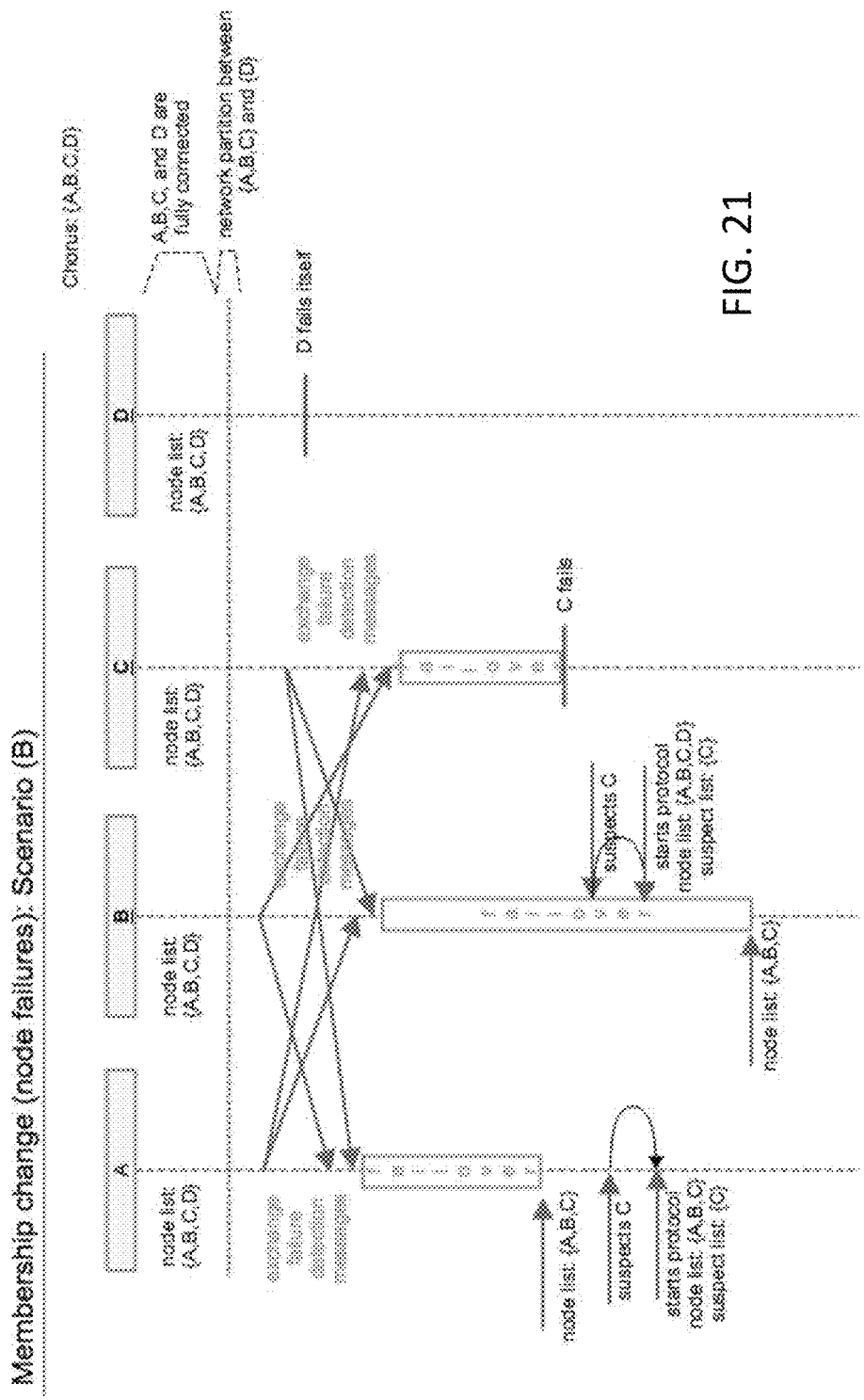
FIG. 21 illustrates handling node failures while running failover.

In FIG. 21, the chorus includes members {A, B, C, D}. A network partition separates {A, B, C} from D. Nodes A, B, and C start the protocol, exchange failure detection messages, and decide to stay up. Node A, B, and C start failover for node D. After A completes the failover for D (and removes D from its node list) and while B is still running failover for D, node C fails. This causes A to suspect C and to start the node failure process with chorus {A, B, C} and suspect list {C}. It also causes B to start the node failure process with chorus {A, B, C, D} and suspect list {C, D}. As a result, A and B do not agree on chorus membership.

In this case, the nodes are made to agree on chorus size as follows:

The nodes that haven't failed exchange their complete connectivity information (i.e., their neighbor node lists together with their suspect node lists) during rounds 1 and 2 of the broadcasts. The nodes compare their suspect and neighbor node lists with their neighbors' suspect and neighbor node lists after receiving round 1/round 2 messages. If a node finds that its neighbor knows about $n_j$ nodes that it doesn't know about, then it increments its chorus size by $n_j$ and restarts the failure resolution process.

So if n is the number of nodes in a majority partition, f is the number of failed nodes, e is the number of evicted nodes for which failover is being run, the nodes in the partition will stay up if $(n-f) \geq (s/2+1)$, where $(n \leq s \leq n+e)$.

But what if failover completes on a node while the node is running the failure resolution process? In order to increase the chances of keeping the chorus members up, the following changes can be made to the failure resolution process: after a node completes failover for an evicted node, it will restart the failure resolution process (if one is in progress), which causes the process to run with a smaller chorus size.

In order to make all nodes agree on chorus size if a node restarts with a smaller chorus size, the process can be further extended as following: the nodes exchange their complete connectivity information (i.e., their neighbor node lists together with their suspect node lists) during rounds 1 and 2 of the broadcasts. Then the nodes compare their suspect and neighbor node lists with their neighbors' suspect and neighbor node lists. If a node finds that its neighbor knows about $n_j$ nodes that it doesn't know about, then it increments its chorus size by $n_j$ and restarts the process. Later, if the node's neighbor restarts the process by removing $r_j$ nodes from its chorus list, then the node decrements its chorus size by $r_j$ and restarts the process.

While this makes the nodes agree on chorus size, the nodes don't need to agree on chorus membership (or chorus size) so long as the nodes with questionable membership and new nodes are failed. In other words, each node can run the failure resolution process based on the chorus membership decided by that node's master catalog node list. The process ensures that all nodes arrive at a correct result as long as any nodes whose membership isn't agreed upon on are either failed before the process starts or failed during the process.

To see why this, holds let $n+n_j$ be the number of nodes in a chorus. n is the number of nodes whose master catalog is complete, and $n_j$ is the sum of the number of failed nodes and the number of nodes that will fail (as in the node failure case; the master catalog of these nodes might or might not be complete at the time they failed) or the number of new nodes that will fail once they start the failure resolution protocol (as in the node join case; the master catalog of these nodes won't be complete at the time they fail).

Let s be the size of the master catalog node list on nodes that participate in the failure resolution protocol: $n \leq s \leq n+n_j$. Note that s might not be the same on all nodes participating in the failure resolution protocol.

Can the failure resolution protocol ensure that the nodes in at most one partition will stay up if each node runs the protocol with a chorus size set to its own master catalog node list size? Yes, because the majority group size computed by each node is at least $(n/2+1)$ since $n \leq s \leq n+n_j$. If each node within a partition can conclude that it is in a majority group $(n/2+1 \leq$ majority group size $\leq (n+n_j)/2+1)$, then that partition has at least $(n/2+1)$ nodes. Since there are only n nodes participating in the protocol, there can be at most one such partition. So nodes in at most one partition can successfully complete the failure resolution protocol and stay up.

Not every node within a partition needs to conclude that it is in a majority fully connected component for that partition to become the winning fully connected component. A subset of nodes within a partition, depending on their master catalog node list sizes, may conclude that they are not in a majority group. These nodes fail during stage 2 of the process (FIG. 12), causing the rest of the nodes within that partition to restart the process. But if the rest of the nodes, on restart of the process, can conclude that they are in a majority group, then that can be enough to make that fully connected component the winning fully connected component.

Satisfying Additional Performance Goals

If the user chooses to shut down half or more of the chorus member nodes, failure detection cannot be triggered. This is achieved by modifying the failure resolution process not to treat manually shut-down nodes as suspect nodes.

Identifying Nodes That Are Shutting Down

On receiving a shutdown request from the admin layer, a node broadcasts a message node state (MsgNodeState) message indicating that it is shutting down (e.g., with node state NODE_STATE_SHUTTING_DOWN). An admin layer in a distributed database system is a layer of nodes via which a user can interact with the distributed database. The admin layer can track nodes in the distributed database system and can facilitate interaction between the user and the nodes in the distributed database system. For example, when a user wants to shut down a node, the user can give the shutdown command to the admin layer, which then sends the shutdown message to the node specified by the user. The process relies on at least one chorus member receiving this node state message from the node that is shutting down.

Failure Resolution Protocol Changes

The following change can be made to failure resolution protocol:
 (a) During stage 1 of the process (FIG. 12), do not consider a node that is known to be shutting down as a suspect node; and
 (b) Make chorus members gossip about nodes that are shutting down (e.g., by exchanging failure detection messages during stages 3 and 4 of the process).

Here is an example of how these changes can satisfy the desire to identify nodes that are being shut down manually: consider a chorus with nodes A, B, C, and D. Suppose the user shuts down nodes C and D at about the same time. Assume only node A receives the node state message from C and only node B receives the node state message from D. Node A starts the failure resolution process with chorus {A, B, C, D}, suspect list {D}, and shutting-down node list {C} and sends a round 1 failure detection message to B. Node B starts the protocol with chorus {A, B, C, D}, suspect list {C}, and shutting-down node list {D} and sends a round 1 failure detection message to A. In response to receiving the failure detection message, node A updates its shutting-down node list to {C, D} and suspect list to { } and restarts the protocol. Node B does the same. After round 1, nodes A and B conclude that they are in a majority partition based on a chorus size=4 and a suspect node list size=0 and stay up.

But how will the modified protocol arrive at a correct process if a network partition or a link failure happens while a node is shutting down? Consider this scenario: A chorus includes nodes A, B, C, D, and E. The user shuts down node E and at about the same time a network partition separates {A, B} from {C, D}. Assume all nodes receive the node state message from E. Node A starts the protocol with chorus {A, B, C, D, E}, suspect list {C, D}, and shutting-down node list {E} and sends a round 1 failure detection message to B. Node B also starts the protocol with chorus {A, B, C, D, E}, suspect list {C, D}, and shutting-down node list {E} and sends a round 1 failure detection message to A. On receiving the failure detection messages, nodes A and B conclude that they are in a majority partition (based on a chorus size=5 and a suspect node list size=2) and stay up. Nodes C and D also stay up by the same logic. The following approach can ensure that the protocol arrives at a correct process in this scenario: treat shutting-down nodes as suspect nodes if a network partition (or a link failure) happens while a node(s) is shutting down.

In summary, if the user shuts down half or more of the chorus member nodes (let SD be this set of nodes) then this process will make the rest of the nodes (let NSD be this set of nodes) stay up if the following conditions hold:

(A) At least one node in NSD receives the node state change message from each node in SD.
(B) Each node in NSD receives the node state message from at least one node in SD. (This is because if a node in NSD doesn't receive the node state message from any node in SD, then that node will suspect all nodes in SD and will fail itself during stage 2, before it learns about shutting-down nodes from other nodes).
(C) No network partitions or link failures happen until the nodes in NSD complete the failure resolution protocol and evict the nodes in SD from the chorus.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for resolving a failure in a distributed database, the distributed database including a plurality of nodes, each node in the plurality of nodes directly connected to each other node in the plurality of nodes, the method comprising:
at a first node in the plurality of nodes:
detecting an interruption in communication with a second node in the plurality of nodes caused by the failure;
in response to detecting the interruption, initiating coordinated broadcasts of lists of suspicious nodes among neighbor nodes in the plurality of nodes, the neighbor nodes being nodes in the plurality of nodes that remain directly connected to the first node after the failure, the list of suspicious nodes for the first node including the second node;
determining connectivity information based on the lists of suspicious nodes; and
resolving the failure based at least in part on the connectivity information.

2. The method of claim 1, wherein initiating the coordinated broadcasts comprises broadcasting, by the first node, an indication of a failure resolution protocol invoked by the first node for resolving the failure.

3. The method of claim 1, wherein the coordinated broadcasts comprise:
a first round in which the first node sends the first node's list of suspicious nodes to the neighbor nodes and receives a third node's list of suspicious nodes from a third node, the third node being one of the neighbor nodes, and
a second round in which the first node sends the third node's list of suspicious nodes to a fourth node, the fourth node being one of the neighbor nodes.

4. The method of claim 3, wherein the first node's list of suspicious nodes includes nodes in the plurality of nodes suspected by the first node of no longer being directly connected to the first node as a result of the failure.

5. The method of claim 1, wherein determining the connectivity information is based on at most two rounds of coordinated broadcasts.

6. The method of claim 1, wherein:
determining the connectivity information comprises determining, by the first node, that the first node is directly connected to less than half of the nodes in the plurality of nodes, and
resolving the failure comprises failing the first node.

7. The method of claim 1, wherein resolving the failure comprises failing the first node based at least in part on the connectivity information.

8. The method of claim 1, further comprising, at each of the neighbor nodes:
performing a comparison of that neighbor node's list of suspicious nodes with the list of suspicious nodes from at least one other neighbor node.

9. The method of claim 1, further comprising:
at each of the neighbor nodes, preparing a connectivity graph based at least in part on the coordinated broadcasts.

10. The method of claim 1, further comprising:
after detecting the interruption and before initiating the coordinated broadcasts, determining, by the first node, which nodes in the plurality of nodes are suspected of no longer being directly connected to the first node as a result of the failure.

11. A distributed database comprising:
a plurality of nodes, each node in the plurality of nodes directly connected to each other node in the plurality of nodes, the plurality of nodes comprising:
a first node configured to:
detect an interruption in communication with a second node in the plurality of nodes caused by a failure in the distributed database;
in response to detecting the interruption, initiate coordinated broadcasts of lists of suspicious nodes among neighbor nodes in the plurality of nodes, the neighbor nodes being nodes in the plurality of nodes that remain directly connected to the first node, the list of suspicious nodes for the first node including the second node;
determine connectivity information based on the lists of suspicious nodes; and
resolve the failure based at least in part on the connectivity information.

12. The distributed database of claim 11, wherein the first node is configured to initiate the coordinated broadcasts by broadcasting an indication of a failure resolution protocol for resolving the failure.

13. The distributed database of claim 11, wherein the coordinated broadcasts comprise:
a first round in which the first node sends the first node's list of suspicious nodes to the neighbor nodes and receives a third node's list of suspicious nodes from a third node, the third node being one of the neighbor nodes, and
a second round in which the first node sends the third node's list of suspicious nodes to a fourth node, the fourth node being one of the neighbor nodes.

14. The distributed database of claim 13, wherein the first node's list of suspicious nodes includes nodes in the plurality of nodes suspected by the first node of no longer being directly connected to the first node as a result of the failure.

15. The distributed database of claim 13, wherein the first node is configured not to participate in the second round if the first node's list of suspicious nodes matches the lists of suspicious nodes received by the first node during the first round.

16. The distributed database of claim 15, wherein the first node is further configured to determine if the first node's list of suspicious nodes includes more than half of the nodes in the plurality of nodes in response to updating the first node's list of suspicious nodes and to fail itself if the first node's list of suspicious nodes includes more than half of the nodes in the plurality of nodes.

17. The distributed database of claim 13, wherein the first node is further configured to update the first node's list of suspicious nodes in response to determining that another node in the plurality of nodes has failed.

18. The distributed database of claim 11, wherein the first node is further configured to fail itself if the first node's list of suspicious nodes includes more than half of the nodes in the plurality of nodes.

19. The distributed database of claim 11, wherein the first node is configured to determine the connectivity information based on at most two rounds of coordinated broadcasts.

20. The distributed database of claim 11, wherein the first node is further configured to fail itself if the connectivity information indicates that the first node is directly connected to less than half of the nodes in the plurality of nodes.

\* \* \* \* \*